(12) United States Patent
Bruno

(10) Patent No.: US 7,313,143 B1
(45) Date of Patent: Dec. 25, 2007

(54) METHOD FOR DIVERSITY SITE GROUP OPERATIONS IN AIR/GROUND COMMUNICATIONS

(75) Inventor: Ronald Bruno, Arlington, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 818 days.

(21) Appl. No.: 10/670,306

(22) Filed: Sep. 26, 2003

(51) Int. Cl.
*H04L 12/28* (2006.01)

(52) U.S. Cl. ............ 370/395.4; 342/36; 455/430; 455/431; 701/120

(58) Field of Classification Search ........ 455/430, 455/431; 370/395.4; 701/120; 342/36
See application file for complete search history.

(56) References Cited

U.S. PATENT DOCUMENTS

| | | | | |
|---|---|---|---|---|
| 3,879,581 | A * | 4/1975 | Schlosser et al. | 370/324 |
| 5,123,112 | A * | 6/1992 | Choate | 455/524 |
| 5,319,374 | A * | 6/1994 | Desai et al. | 342/387 |
| 5,450,329 | A * | 9/1995 | Tanner | 701/213 |
| 6,078,577 | A * | 6/2000 | Bishop et al. | 370/348 |
| 6,477,163 | B1 * | 11/2002 | Miller | 370/347 |
| 2003/0084451 | A1 * | 5/2003 | Pierzga et al. | 725/47 |
| 2005/0164664 | A1 * | 7/2005 | DiFonzo et al. | 455/277.1 |
| 2005/0180427 | A1 * | 8/2005 | Eriksson et al. | 370/395.4 |

* cited by examiner

*Primary Examiner*—Joseph Feild
*Assistant Examiner*—Inder Pal Mehra
(74) *Attorney, Agent, or Firm*—Edell, Shapiro & Finnan, LLC

(57) ABSTRACT

Shortcomings in conventional Very High Frequency (VHF) Digital Link Mode 3 (VDL-3) communication techniques for implementing air/ground (A/G) diversity site group (DSG) communication are identified and resolved. Beacon schedules are used to coordinate the use of VDL-3 TDMA management slots. Limited autonomy local address management techniques are used to distribute blocks of unique addresses to the ground stations (GS's) of a DSG from a common base of local addresses maintained at a control site, thus assuring that the respective ground stations assign a unique local identifier to each aircraft supported by the DSG. Aircraft supported by a DSG are polled to obtain time of arrival (TOA) and signal quality information used to: intelligently select the transmit ground station and the receive ground station used for communication between an specific aircraft and the control site; and, intelligently manage contiguous communication handoffs of aircraft from one ground station to another ground station of the DSG.

24 Claims, 24 Drawing Sheets

M AND V BURSTS IN A VDL MODE 3 TDMA FRAME

--VOICE ONLY CONFIGURATION--

| A | B | C | D | A | 5 | V | B | C | D |
|---|---|---|---|---|---|---|---|---|---|

FIG.5

M AND V BURSTS IN A VDL MODE 3 TDMA FRAME

--DATA AND VOICE CONFIGURATION--

| A | B | C | 3 | D | A | 5 | V | B | 7 | C | D |
|---|---|---|---|---|---|---|---|---|---|---|---|

FIG.6

| GS # | 1 | 2 | 3 | 4 | 1 | 2 | 3 | 4 | 1 | 2 | 3 | 4 |
|---|---|---|---|---|---|---|---|---|---|---|---|---|
| No. MAC CYCLES | 2 | 2 | 2 | 2 | 2 | 2 | 2 | 2 | 2 | 2 | 2 | 3 |

FIG.10

| GS # | 1 | 2 | 3 | 4 | 1 |
|---|---|---|---|---|---|
| No. MAC CYCLES | 4 | 4 | 4 | 4 | 5 |

FIG.11

METHOD FOR DIVERSITY SITE GROUP OPERATIONS IN AIR/GROUND COMMUNICATIONS

BACKGROUND OF THE INVENTION

1. Field of Invention

The present invention relates to methods and apparatus for implementing diversity site group operations in air/ground communications and, more particularly, to methods and apparatus associated with diversity site group operations in an integrated digital voice/digital data communications environment.

2. Description of the Related Art

In air traffic control (ATC), air/ground (A/G) radio communication between a ground-base controller and an aircraft is typically supported by a ground station (GS) at a remote location. The controller is typically at a centralized control facility and manages the radio resources at the remote ground station via terrestrial telecommunication links. The aircraft in the domain of a ground station are referred to as a talk group. ATC A/G communication is based upon a simplex protocol in which the ground station transmitter and aircraft transmitters associated with a common talk group share a single A/G communication channel.

To extend the geographical area of A/G communication and/or to improve communication coverage within an identified geographical area controlled by a single controller, it is common to combine the airspace served by two or more radio communication ground stations so that a single controller can use the resources of multiple ground stations to manage a talk group. The multiple ground stations operating in this mode of operation are referred to as a diversity site group (DSG). FIG. 1 is a system-level diagram depicting a representative DSG 100. In a DSG, while all ground stations and aircraft in the talk group listen simultaneously for transmissions, only one ground station or aircraft transmitter can broadcast during any given period of time, because simultaneous broadcasts from multiple transmitters will typically interfere with each other and thus prohibit communications.

In the representative DSG 100 presented in FIG. 1, a control switch 102 is configured to communicate with multiple ground stations, wherein each ground station provides Very High Frequency (VHF) A/G communication to a geographical area of airspace. As shown in FIG. 1, a single control switch 102 communicates with geographic area 106 via ground station 104, communicates with geographic area 110 via ground station 108, and communicates with geographic area 114 via ground station 112. The challenge of managing a DSG is to have the control switch manage and coordinate the actions of the ground stations so that they appear to the aircraft in the talk group as a single ground station. By managing a DSG in this manner, airspace 106, airspace 110 and airspace 114 are effectively combined to form a single integrated geographic airspace 116 supported with A/G communication by the integrated ground stations of the DSG 100.

Very High Frequency (VHF) Digital Link Mode 3 (VDL-3) is a standard for integrated digital voice and data promulgated by the Radio Technical Commission for Aeronautics (RTCA) for A/G communications. The standard is based upon VHF carriers with 25 kHz spacing so as to be consistent with the current Double Side-Band Amplitude Modulation (DSB-AM) system for A/G analog voice. The symbol rate is 10.5 ksps and the symbol space is 8-Phase Shift Keying (8-PSK). Thus, each symbol carries 3 bits, and the supported bit rate is 31.5 kbps.

Each VDL-3 25 kHz RF carrier is composed of sequential time-division multiple access (TDMA) 240-msec Media Access Control (MAC) cycles. FIG. 2 is a schematic depicting a representative TDMA 240-msec MAC cycle 200. As indicated in FIG. 2, each 240-msec VDL-3 MAC cycle 200 is composed of two 120-msec frames (i.e., an even frame 202 and an odd frame 204). Each 120-msec frame is composed of four 30-msec time slots. In the representative MAC cycle shown in FIG. 2, even frame 202 contains time slot 206, time slot 208, time slot 210, and time slot 212. Odd frame 204 contains time slot 214, time slot 216, time slot 218, and time slot 220.

As indicated in FIG. 2, a representative 30-msec time slot (e.g., time slot-A of even frame 202) incorporates both a management (M) burst 222 and a voice or data (V/D) burst 224. The M bursts 222 are used by the ground station to provide a time reference, a channel status and for coordinating access to the M and V/D slots by aircraft. Aircraft use the M slots to register with the talk group and request channel resources. V/D bursts 224 are used by both ground stations and aircraft to transmit voice and data bursts.

In VDL-3, each 25 kHz RF carrier supports four separate TDMA channels, wherein each channel is defined by a time slot. Like the DSB-AM system it replaces, VDL-3 is a simplex communications standard whereby the ground stations and all the aircraft in a talk group communicate on a common channel (same frequency and time slot). Each of the four VDL-3 channels supported by a single 25 kHz RF carrier is supported by one of the four respective 30-msec time slots that make a 120-msec frame.

For example, referring again to FIG. 2, within a single MAC cycle, one of the four VDL-3 TDMA channels supported by a single 25 kHz RF carrier (e.g., channel-A) can be supported by time slot-A 206 within even frame 202 and by time slot-A 214 within odd frame 204. A second TDMA channel supported by the same 25 kHz RF carrier (e.g., channel-B) can be supported by time slot-B 208 within even frame 202 and by time slot-B 216 within odd frame 204. A third TDMA channel supported by the same 25 kHz RF carrier (e.g., channel-C) can be supported by time slot-C 210 within even frame 202 and by time slot-C 218 within odd frame 204. A fourth TDMA channel supported by the same 25 kHz RF carrier (e.g., channel-D) can be supported by time slot-D 212 within even frame 202 and by time slot-C 220 within odd frame 204.

DSG Management in Existing Analog DSB-AM Voice Systems

DSGs operations for existing AM voice systems are conducted primarily under the manual operation of a controller. As indicated in FIG. 1, only one ground station transmits at any given time, while all the ground station of a DSG receive simultaneously. Typically, the transmitting ground station is chosen by the controller from within the control site by configuration of the voice switch. While multiple ground station may relay a signal received from an aircraft to the control site, the controller chooses among the received signals. This choice can be made by the controller by manually configuring the controller switch, or may be determined automatically by the controller switch. Typically, a controller switch is configured by the controller to choose the first signal arriving at the switch that meets a defined signal quality.

DSG Management in Existing Digital Voice and Data Systems

VDL-3 is a mature specification of a digital voice and data system insofar as a single ground station is involved. However, at the current time, the specification does not address DSG operations. Additionally, there are no proposals that describe a complete solution to the problem. In VDL-3, avoiding simultaneous transmissions is more complicated than with DSB-AM because of a number of factors. For example, M slots and V/D slots are separate resources and are managed separately. Additionally, the M slots support signaling data transactions between radios that are orchestrated by computers, not the controller. Thus, it is clear that a method for managing the transmissions from the ground stations of a DSG is complex and involves both automated computer and controller actions. This is further underscored by the operations of VDL-3 with a single ground station. FIG. 3 is a system level block diagram depicting control of VDL Mode 3 transmissions using a single ground station configuration. FIG. 3 illustrates that a control site 302 manages the use of voice slots, but that the ground station 304 manages the utilization of management slots and data slots. Thus, while the voice slots are under the control of a human operator, a computer autonomously controls transmissions into the M and D slots. As previously described, the challenge of managing a DSG in VDL-3 is to have the control site manage and coordinate the actions of the ground stations so that the ground stations appear to the aircraft in the talk group as a single ground station.

Shortcomings of Existing Analog DSB-AM Voice Systems

One shortcoming of existing analog DSB-AM voice systems is that the controller is often presented with insufficient information by which to intelligently choose which ground station to transmit from and which ground station to receive from. FIG. 4 is a system level diagram depicting selection of a ground station signal by an analog controller switch. FIG. 4 illustrates a case where a weak radio signal, received from an aircraft 402 at a first ground station 404 of a DSG, arrives at a voice switch 408 of a control site before a stronger radio signal received from the same aircraft 402 at a second ground station 410 of the DSG. In this representative example, the stronger signal is delayed in reaching voice switch 408 due to a longer telecommunication delay between the control site and the second ground station 410. Such a condition can result in using a poor communication path to receive an incoming signal when a good communication path is available. Often, a controller will choose to transmit an outbound signal over the same ground station chosen to receive an incoming signal. Thus, if a poor choice is made for the receive ground station, the same poor choice will likely be made for the transmit ground station.

Shortcomings of Existing Digital Voice and Data Systems

Existing digital voice and data systems have a shortcoming similar to that described above. Information available to the controller by which to intelligently choose which ground station to receive from and which ground station to transmit from is often unavailable. The issue with respect to existing digital voice and data systems is essentially the same as that described above for DSB-AM voice systems. However, the consequences of a poor choice of transmitter can be more severe in digital voice and data systems. For example, in the VDL Mode 3 system, an aircraft does not accept M or V/D bursts that arrive ±1 symbol offset from perfect timing. Thus, if an aircraft receives timing from a first ground station (i.e., GS1), it will not accept transmissions from a second ground station (i.e., GS2) if the time-of-flight path difference from the aircraft to the two ground station is greater than 1 VDL-3 symbol. At 10.5 ksps, this corresponds to path difference of 17.86 miles in distance.

A second shortcoming with respect to existing digital voice and data systems is a lack of a method to coordinate ground station transmissions in M slots. A beacon is an uplink M burst that occurs in the middle of the VDL-3 240 msec Media Access Control (MAC) cycle. A single ground station (not operating within a DSG) transmits a periodic beacon M burst as indicated in FIG. 5. FIG. 5 depicts representative M and V bursts in a VDL Mode 3 TDMA frame (voice only) configuration. Within a DSG, the ground stations need coordination so that only one ground station transmits at the same time. The beacon provides system time to all aircraft in the talk group. In VDL-3 it is referred to as Logical Burst Access Channel (LBAC) 5. VDL-3 has a corresponding downlink management slot that aircraft transmit on that is called LBAC 1. FIG. 5 illustrates LBACs 1 and 5 in the context of a voice only service. VDL-3 voice and data service configurations have a richer set of LBACs. A single ground station (not operating within a DSG) that supports voice and data service transmits a periodic beacon M and V bursts as indicated in FIG. 6. FIG. 6 depicts representative M and V bursts in a VDL Mode 3 TDMA frame (voice and data) configuration. In this configuration, slots A and C are the voice and data channels for a single talk group, respectively. LBAC 5 is still the only ground station Management burst, but aircraft have access to LBACs 3 and 7 as well as LBAC 1.

A third shortcoming associated with existing digital voice and data systems is a lack of a method to coordinate ground station assignment of local addresses. In VDL-3 an isolated ground station has the autonomy to assign a temporary local ID to each aircraft while the aircraft is in its domain. However, within a DSG, all ground stations share a single address space of local IDs. Thus, a system for coordinating and sharing the address space by ground stations of a DSG is needed.

Additional shortfalls associated with existing digital voice and data systems include: lack of a method for tracking the status of communication channels between aircraft and ground stations of a DSG; lack of a method for controlling A/G communication handovers between the ground stations of a DSG; and lack of a method for routing addressed messages within a DSG. With respect to the routing of addressed messages, no method is specified in VDL-3 for determining through which ground station of a DSG an aircraft can be reached. Such a capability is necessary for assigning polling responsibility to a ground station as well as routing messages addressed to an aircraft to the correct ground station. As a corollary, no method is described in VDL-3 for handing over polling responsibilities of an aircraft among the ground station in a DSG.

Yet another shortfall associated with existing digital voice and data systems is a lack of a method to coordinate ground station transmissions in data slots. In VDL-3, a ground station that is not part of a DSG has the autonomy to manage and assign data slots to aircraft that make reservation requests on downlink M slots. However, within a DSG, all ground stations share a single set of data slots. Therefore, a system for coordination and sharing of the data slots by ground stations of a DSG is needed.

Accordingly, there is a need for methods and apparatus that allow a digital voice and data A/G communication system controller to: intelligently choose which ground station to transmit from and which ground station to receive from; coordinate M slot transmissions and data slot transmissions by ground stations within a DSG; coordinate the assignment of local addresses assigned to aircraft by ground stations within a DSG; track the status of A/G communications between an aircraft and the ground stations of a DSG; control A/G communication handovers between the ground stations of a DSG; route addressed messages along a desired path within a DSG; and, control the handover of polling responsibilities of an aircraft between ground stations in a DSG.

SUMMARY OF THE INVENTION

Therefore, in light of the above, and for other reasons that become apparent when the invention is fully described, an object of the present invention is to permit the use of an integrated digital voice and data communication protocol, such as VDL-3, in A/G communication supported by multiple ground stations as a DSG.

Another object of the present invention is to avoid A/G communication disruptions as aircraft of a talk group travel across airspaces supported by individual ground stations of the DSG.

Yet another object of the present invention is to prevent communication interference resulting from simultaneous transmissions by ground stations of a DSG and/or transmissions by aircraft of a talk group supported by the DSG.

Still yet another object of the present invention is to integrate the ground stations of a DSG so that the integrated ground stations appear to aircraft of a talk group supported by the DSG as a single ground station.

A further object of the present invention is to improve control site knowledge of the quality and status of A/G communication between an aircraft and the ground stations of a DSG.

Yet a further object of the present invention is to increase control site knowledge of aircraft supported by each ground station of a DSG.

Still a further object of the present invention is to facilitate identification, tracking and coordination of aircraft supported by a DSG and the use of information derived there from to enhance communication quality and availability to aircraft of a talk group supported by a DSG.

The aforesaid objects are achieved individually and in combination, and it is not intended that the present invention be construed as requiring two or more of the objects to be combined unless expressly required by the claims attached hereto.

The methods and apparatus described here, implement a set of techniques that permit use of an integrated digital voice and data communication protocol, such as VDL-3, in A/G communication supported by multiple ground stations as a DSG. This set of implemented techniques includes:

- beacon schedules to coordinate the use of TDMA management slots by the ground stations of a DSG and the use of techniques to dynamic reallocate beacon schedule slots among the ground stations of a DSG to accommodate changes in aircraft traffic density supported by the respective ground stations of a DSG;
- Limited autonomy over local aircraft unique identifiers (or addresses) is granted from the DSG control site to the ground stations of the DSG by distributing blocks of addresses to the ground stations of the DSG from a common base of addresses maintained by the DSG control site, wherein the respective ground stations have autonomy for the allocation local addresses to aircraft and responsibility for sharing assigned address information with other ground stations of the DSG;
- Repetitive polling of aircraft supported by a DSG, the generation of signal tracking reports (STR) by ground stations of the DSG in response to receipt of responses from polled aircraft;
- Continuous assessment of STR's by the DSG control site and their use to monitor and track the quality and status of communication channels supported by the DSG;
- Use of the generated quality and status information to intelligently select the transmit ground station and the receive ground station for communication between an aircraft and the control site and the use of techniques to dynamically reallocate transmit ground station and the receive ground station selections for each aircraft supported by the DSG; and
- Use of generated quality and status information to intelligently manage contiguous communication handoffs of an aircraft from one ground station to another ground station of the DSG as the aircraft traverses the airspace supported by the individual ground stations of the DSG.

Based upon the methods and apparatus described in detail, below, a digital voice and data system, such as VDL-3, is able to overcome the barriers of conventional digital voice and data systems that prevent implementation of diversity site groups (DSG's).

Methods, apparatus and articles of manufacture are described that include allocating transmission time slots to a plurality of ground stations in an air/ground communication environment in which a control site communicates with a plurality of aircraft via a plurality of ground stations. Each of the plurality of aircraft is in radio communication with at least one of the plurality of ground stations, and the plurality of ground stations and the plurality of aircraft share a common air/ground communication channel. The described approach includes building a transmission time slot schedule containing a transmission time slot allocation for at least one of the plurality of ground stations and distributing the transmission time slot schedule from the control site to at least one of the plurality of ground stations so that a ground station that receives a time slot allocation assumes management over use of transmission time slots allocated to the ground station by the transmission time slot schedule.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 5 is a schematic depicting representative M and V bursts in a VDL Mode 3 TDMA Frame—Voice Only Configuration.

FIG. 6 is a schematic depicting representative M and V bursts in a VDL Mode 3 TDMA Frame—Data and Voice Configuration.

FIG. 10 is a schematic depicting a representative beacon schedule, that supports only base voice service, in a DSG with four ground stations, in accordance with an exemplary embodiment of the present invention.

FIG. 11 is a schematic depicting a representative beacon schedule, that supports only enhance voice service, in a DSG with four ground stations, in accordance with an exemplary embodiment of the present invention.

DETAILED DESCRIPTION OF THE PREFERRED EMBODIMENTS

The following detailed explanation of the figures and of the preferred embodiments of the present invention reveal methods and apparatus used to implement a set of techniques that make diversity site group operations, in air/ground communication in an integrated digital voice/digital data communication environment, feasible.

Figure 7:
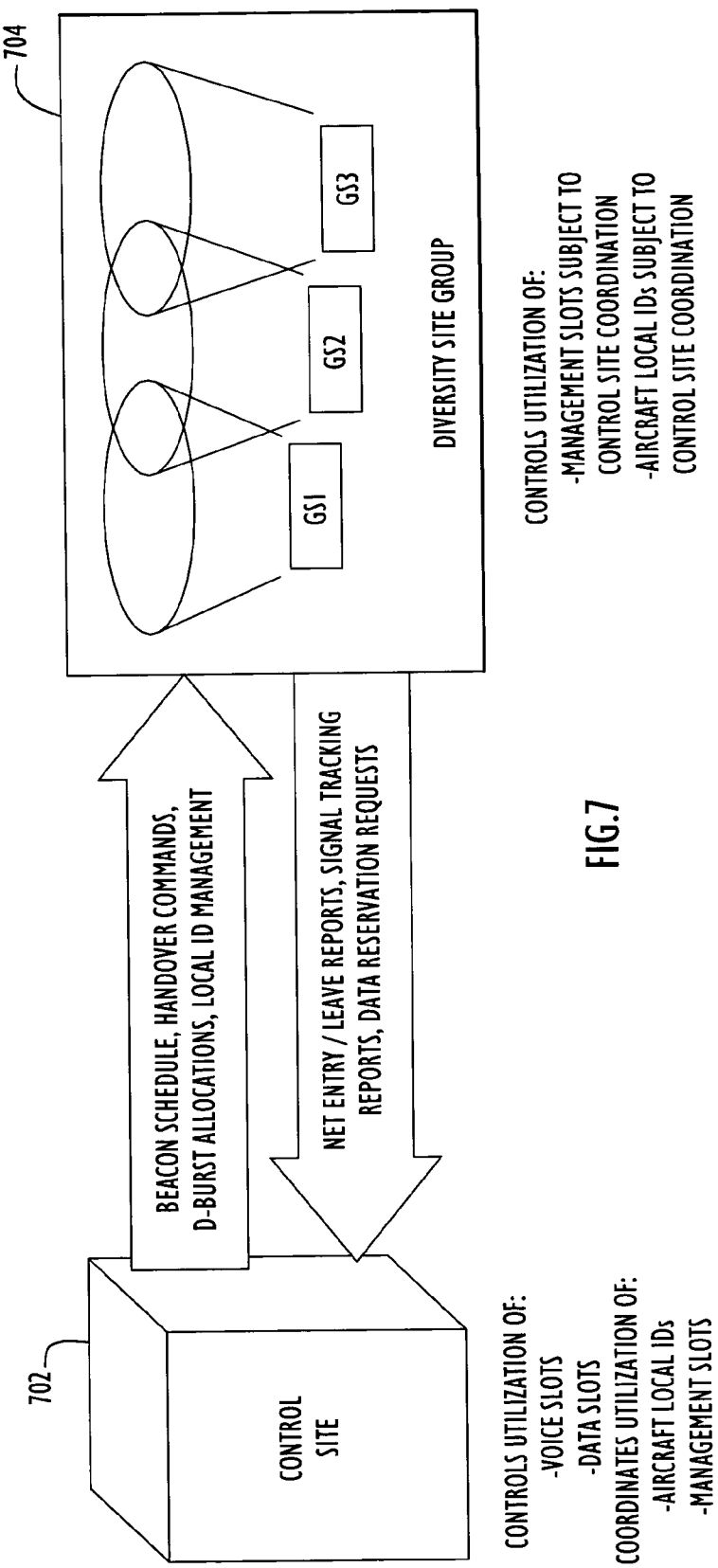
FIG. 7 is a system level block diagram depicting control site management of a DSG in accordance with an exemplary embodiment of the present invention.

FIG. 7 is a system level block diagram depicting control site management of a DSG supported by multiple ground stations. As shown, a set of complimenting techniques are used by the control site and the ground stations to permit use of an integrated digital voice and data communication protocol. FIG. 7 illustrates the functional allocations and overall data flows used for DSG operations in a VDL Mode 3 (VDL-3) system. As shown in FIG. 7, a control site distributes a beacon schedule that coordinates the use of management slots by the ground stations 704 of the DSG, controls issuance of handover commands, regulates data burst transmissions and oversees the distribution of unassigned local aircraft addresses across the respective ground stations of the DSG. Within the constraints posed by control site 702, each of the respective ground stations has control over the use of time slots allocated to each ground station by the beacon schedule, as well as control over local assignment of local addresses allocated to each by the control site. Using such a limited autonomy approach the control site is able to sufficiently coordinate the actions of the ground stations of the DSG, without unduly constraining operation of the respective ground stations of the DSG.

Aircraft Address Management

Aircraft address management is a technique that, in combination with the several techniques described here, supports the use of an integrated digital voice and data communication protocol, such as VDL-3, for A/G communication supported by multiple ground stations as a DSG.

In a VDL 3 system supporting Enhanced Voice Service, an aircraft registers with a ground station when it enters airspace serviced by the ground station. An aircraft registers with the ground station by sending a Net Entry Request to the ground station. In response to the request, the ground station assigns the aircraft a unique aircraft identifier (or address) that is recognized by the ground station and used to coordinate future communication between the aircraft and the ground station. Assignment of a unique aircraft address from a ground station to an aircraft establishes a relationship between the ground station and the aircraft. For example, upon assigning an address to an aircraft, the assigning ground station assumes periodic polling responsibility for that aircraft until the aircraft leaves the airspace serviced by that ground station. When the aircraft leaves the airspace serviced by the ground station, the ground station frees the unique aircraft address for assignment to another aircraft.

A ground station that is part of a DSG must share control over a common set of unique aircraft addresses that are recognized by all the ground stations of the DSG. Therefore, a single ground station of a DSG does not have the autonomy to manage the entire DSG aircraft address space. A DSG control site furnishes (delegates) or takes away (revokes) unique aircraft addresses to/from the ground stations of a DSG. In addition, all ground stations of the DSG monitor the polling responses of the aircraft and file Signal Tracking Reports (STRs) to the DSG control site. The STRs contain TOA and signal quality information that is used by the control site to 'track' the aircraft and determine when to initiate Handover Commands as an aircraft moves from one ground station to another.

Figure 8:
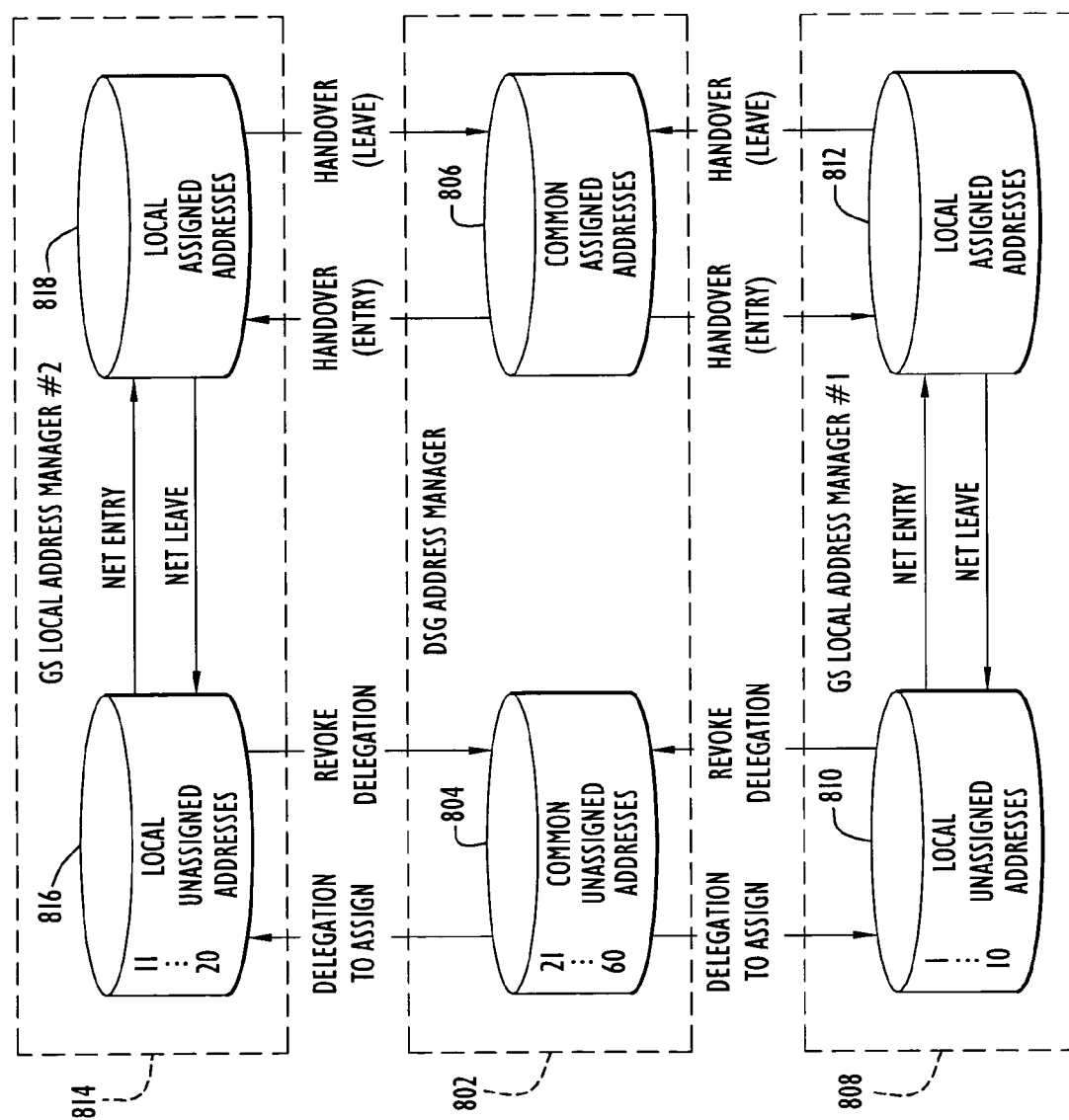
FIG. 8 is a system level block diagram depicting management of aircraft local addresses in accordance with an exemplary embodiment of the present invention.

FIG. 8 is a system level block diagram depicting management of a common base of unique aircraft addresses across ground stations belonging to a common DSG. As shown in FIG. 8, a DSG address manager 802 (a component within a control site control system), with a common base of unassigned addresses 804 and a common base of assigned addresses 806, coordinates the sharing of a common base of unique aircraft addresses with a first ground station 808 and a second ground station 814 belonging to the DSG. Ground station 808 stores unassigned addresses received from the common base of unassigned addresses 804 in a local base of unassigned addresses 810 and logically transfers addresses assigned from its local base of unassigned addresses 810 to it's local base of assigned addresses 812. Likewise, ground station 814 stores unassigned addresses received from the common base of unassigned addresses 804 in a local base of unassigned addresses 816 and logically transfers addresses assigned from its local base of unassigned addresses 816 to it's local base of assigned addresses 818.

Figure 9:
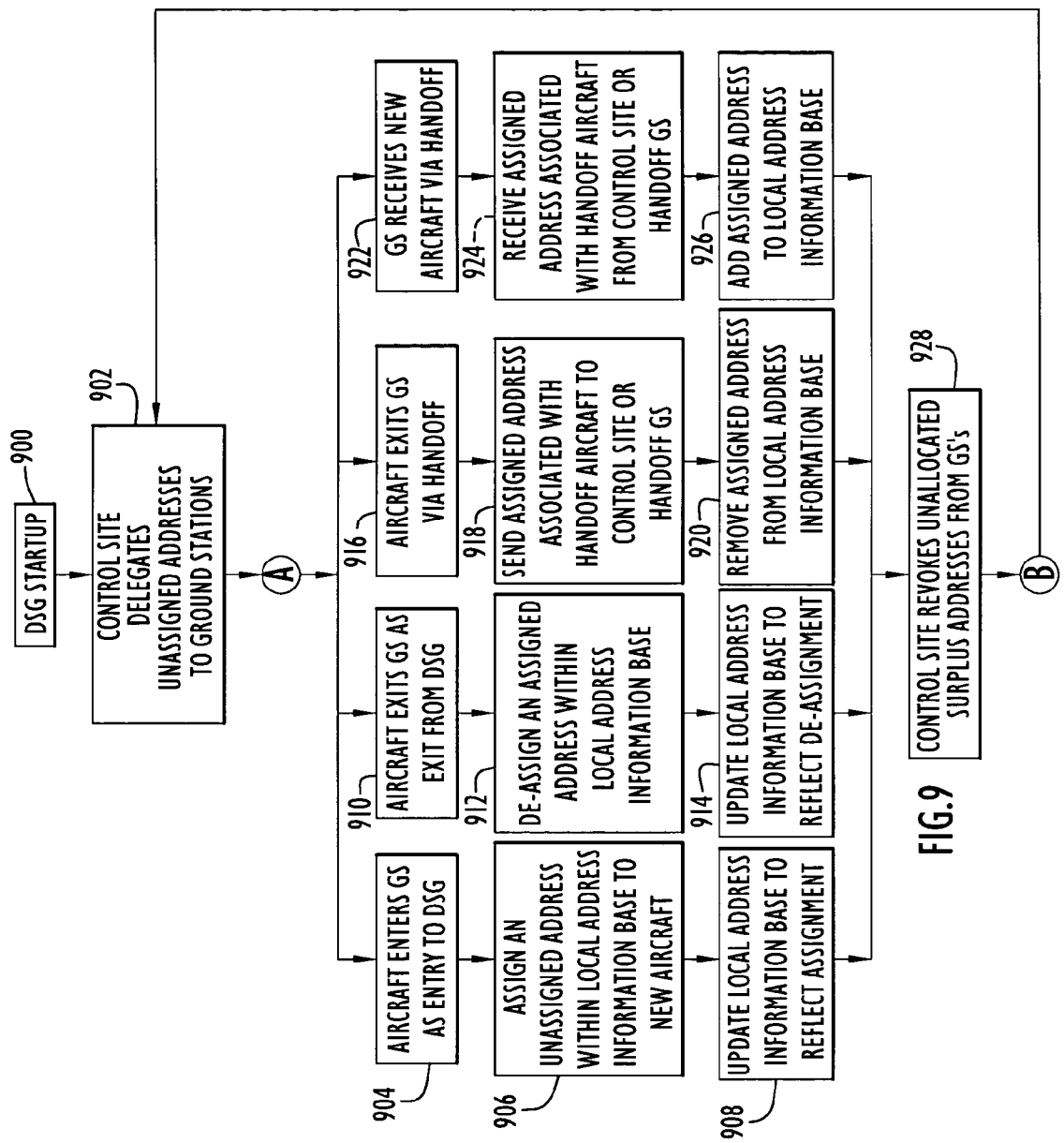
FIG. 9 is a procedural flow-chart illustrating the manner in which unique aircraft identifiers are managed by the control site of a DSG across the respective ground stations of the DSG, in accordance with an exemplary embodiment of the present invention.

FIG. 9 is a procedural flow-chart illustrating the manner by which a control site DSG address manager 802 manages a common base of unique addresses across the respective ground stations of a DSG. As shown in FIG. 9, at DSG startup, in step 900, the control site DSG address manager delegates, in step 902, a portion of the unallocated unique addresses contained within its common base of unassigned addresses (depicted in FIG. 8 as block 804) to each of the ground stations of the DSG. The unassigned addresses are stored by each of the receiving ground stations in their respective local bases of unassigned addresses (depicted in FIG. 8 as block 810 in GS#1 and as block 816 in GS#2).

Upon an aircraft entering the airspace of a ground station as a new entry to the DSG, at step 904, the ground station assigns to the aircraft, at step 906, an unassigned address from its local base of unique addresses, and updates its local base of addresses, at step 908, to reflect assignment of the address. Such an event is reflected in FIG. 8 as a Net Entry transfer of an address from the local base of unassigned addresses (e.g., shown with respect to ground station 808 at 810) to the local base of assigned addresses (e.g., shown with respect to ground station 808 at 812).

When an aircraft exits a ground station, at step 910, as an exit from the DSG, the ground station de-assigns, at step 912, the assigned address and updates, at step 914, it's local information base to reflect the de-assignment. Such an event is reflected in FIG. 8 as a Net Leave transfer of an address from the local base of assigned addresses (e.g., shown with respect to ground station 814 at 818) to the local base of assigned addresses (e.g., shown with respect to ground station 814 at 816).

When an aircraft exits a ground station, at step 916, as a handoff to another ground station within the DSG, the ground station transfers the assigned address, at step 918, to the DSG address manager and removes the assigned address, at step 920, from it's local information base. Such an event is reflected in FIG. 8 as a Handover(Leave) transfer of an address from a local base of assigned addresses (e.g., shown with respect to ground station 808 at 812) to the DSG address manager's common base assigned addresses (e.g., shown with respect to the control site DSG address manager 802 at 806).

When an aircraft enters a ground station, at step 922, as a handoff from another ground station within the DSG, the ground station receives the associated assigned address, at step 924, from the DSG address manager and adds the assigned address, at step 926, to it's local information base. Such an event is reflected in FIG. 8 as a Handover(Entry) transfer of an address from the DSG address manager's common base assigned addresses (e.g., shown with respect to the control site DSG address manager 802 at 806) to a local base of assigned addresses (e.g., shown with respect to ground station 814 at 818).

In this manner the DSG address manager at the DSG control site allocates a subset of unique addresses to the ground stations of the DSG and allows the respective DSG's limited autonomy to manage unique addresses within their respective airspace domains. Based upon the polling and handoff techniques used to coordinate aircraft handovers between the ground stations of a DSG, described in greater detail below, the control site DSG address manager has knowledge of the flow of unique addresses between the ground stations and the identities of assigned and unique addresses stored by each ground stations local address manager. For example, in one non-limiting representative embodiment, the DSG address manager maintains a mirror database of the addresses delegated to each ground station in the DSG that contains the assignment status of each delegated unique address. Based upon such information, the DSG address manager will periodically revoke delegation, at step 928, of a portion of the unassigned addresses managed by a ground stations local address manager so that the addresses can be reallocated, at step 902, to the local address manager's of other ground station's.

Coordination of Ground Station Beacon Transmissions via Scheduling

Beacon scheduling is another technique that, in combination with the several techniques described here, supports the use of an integrated digital voice and data communication protocol, such as VDL-3, for A/G communication supported by multiple ground stations as a DSG.

As described in relation to FIG. 7, a control site distributes a beacon schedule that coordinates the use of management slots by the ground stations of the DSG. Beacon schedules are used to coordinate the use of VDL-3 TDMA management slots by the ground stations of a DSG. The control site periodically reassesses the status of the ground stations of the DSG and reissues a new beacon schedule to dynamically reallocate management slots among the ground stations of a DSG to accommodate changes in aircraft traffic density and asymmetrical voice/data loads supported by the respective ground stations of a DSG. Using beacon schedules, the DSG control site is able to provide the ground stations of the DSG with limited autonomy and to sufficiently coordinate the actions of the ground stations of the DSG, without unduly constraining operation of the respective ground stations of the DSG.

A beacon schedule is a periodic repeating schedule based upon the VDL-3 MAC epoch, which is 6 sec or 25 MAC cycles. It designates the ground station that controls the beacon for a defined time slot in every MAC epoch. The beacon schedule is constructed at the control site and sent to all ground stations in the DSG and is modified as needed to address the service configuration and traffic loading distribution in the DSG. As the distribution of aircraft traffic changes within ground stations of the DSG, the beacon schedule is changed accordingly. As such, the beacon schedule is a high-level manager of the M slot utilization and does not require real-time management and control of the ground stations from the control site. Table 1 summarizes the key design rules for construction of a beacon schedule.

TABLE 1

Beacon Schedule Design Rules

| Service Cfg. | Design Rules |
|---|---|
| Basic Voice | Time slice allocations nominally 2 MAC cycles (2 uplink LBAC 5 bursts) |
| | Schedule the time slices frequently to all DSG coverage areas |
| | Provide at least one time slice to every ground station each MAC cycle |
| Enhanced Voice and Data Link | Time slice allocations are nominally 4 MAC cycles (4 uplink bursts LBAC 5 bursts) - larger slice needed to accommodate VDL Mode 3 Net Entry transaction |
| | Schedule the time slices frequently to all DSG coverage areas |
| | Provide at least one time slice to every ground station each MAC cycle |
| | Modify schedule in response to number of aircraft present in each GS coverage area |

FIG. 10 is a schematic depicting a representative beacon schedule, that supports only base voice service, in a DSG with four ground stations, in accordance with an exemplary embodiment of the present invention. Note that the minimum time slice of the schedule is 2 MAC cycles. Two MAC cycles is the minimum because it entails two consecutive LBAC 5 uplink beacons and this is the requirement for an aircraft to acquire timing from a ground station.

FIG. 11 is a schematic depicting a representative beacon schedule, that supports enhanced voice service, in a DSG with four ground stations, in accordance with an exemplary embodiment of the present invention. Note that the minimum time slice of the schedule is 4 MAC cycles. Four MAC cycles is a reasonable minimum time slice allocation for support of enhanced voice service because many of the M-burst transactions require multiple two-way transmissions between the ground and the air. Four MAC cycles supplies a set of four contiguous LBAC 5 and LBAC 1 response opportunities that can support the most demanding required transaction (i.e., Net Entry). Note also that ground station 1 and ground station 3 are allocated more of the beacon schedule. This would be driven by a greater number of aircraft or communication traffic in the domain of those ground stations, as described in greater detail below.

The beacon scheduler calculates the workload of each of the ground stations in a DSG to construct the ground station schedule. The workload of a ground station depends upon the amount of aircraft traffic, but also contains a component that is independent of aircraft traffic.

Figure 12:
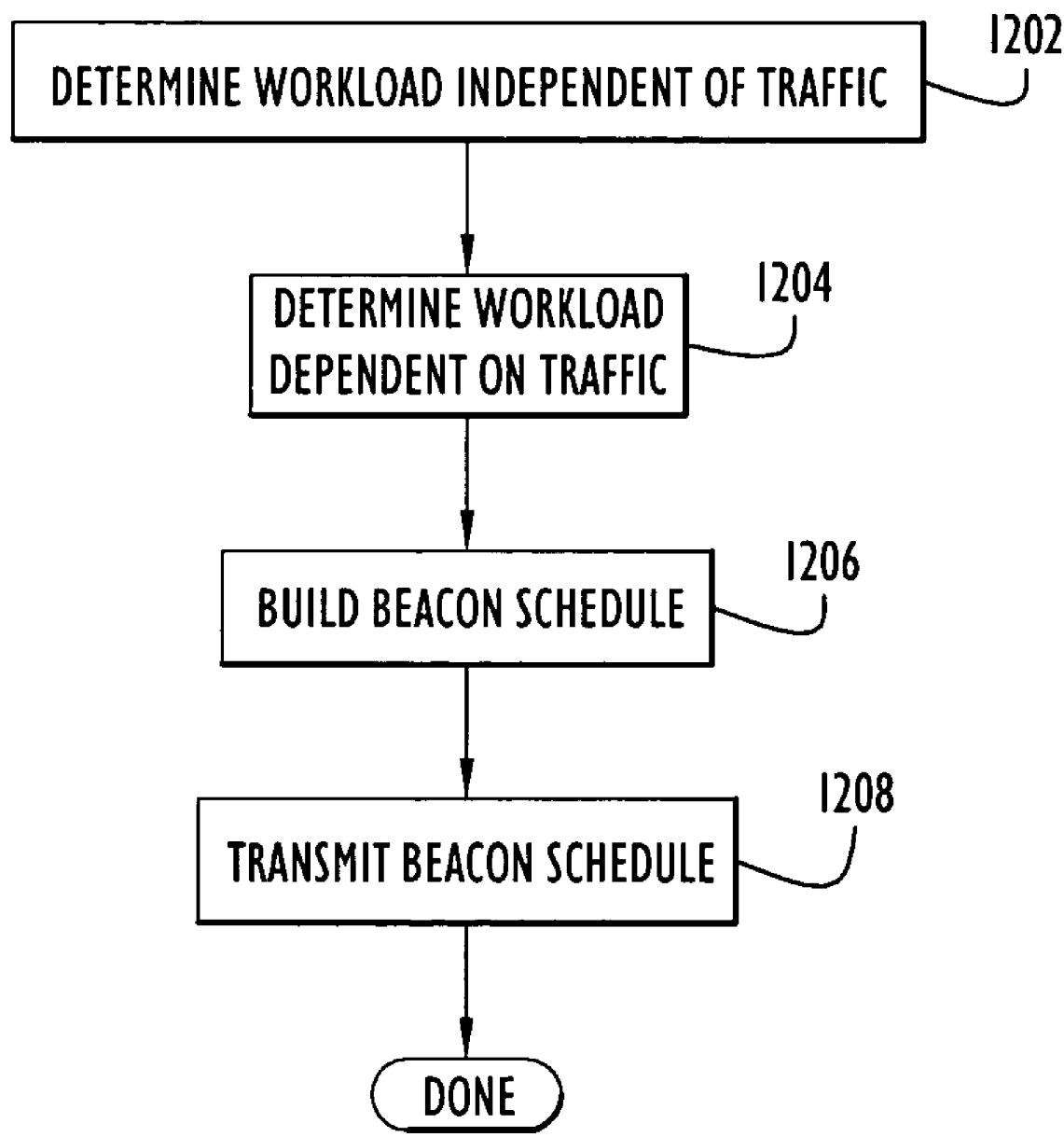
FIG. 12 is a procedural flow-chart illustrating the manner in which the control site of a DSG periodically builds and distributed the beacon scheduled to accommodate workload independent and workload dependent traffic load considerations, in accordance with an exemplary embodiment of the present invention.

FIG. 12 is a procedural flow-chart illustrating the manner in which the control site of a DSG periodically builds and distributes the beacon scheduled to accommodate workload independent and workload dependent traffic load considerations using the non-limiting, representative guidelines described below. As shown in FIG. 12, the DSG control site beacon schedule/data slot resource manager (DSRM) assesses, at step 1202, ground station traffic/work load that is independent on the number of aircraft within the respective ground stations of the DSG. In one representative, non-limiting embodiment, each ground station is provided 2 consecutive LBAC5 uplinks every six seconds to support rapid timing acquisition by entering aircraft, and maintenance of that timing. If rapid Net Entry is supported, each ground station is provided 4 consecutive LBAC5 uplinks every six seconds.

Again referring to FIG. 12, the DSG control site beacon schedule/data slot resource manager next assesses, at step 1204, ground station traffic/work load that is dependent on the number of aircraft within each of the respective ground stations of the DSG. Each ground station has a polling task for all aircraft in its domain. It is desirable that each aircraft should be polled once every 6 seconds. This requires, one or two LBAC5 uplinks, depending upon whether the aircraft response to the poll has a request to send data (in which case the 2nd LBAC5 is needed to respond to that request). However, LBAC5 can do double duty since its payload can poll and reply to a reservation request in the same uplink burst. A ground station can also receive reservation requests outside of the polling cycle and that too drives the workload of a ground station. It is reasonable to assume that this workload is in direct proportion to the number of aircraft.

Once the beacon schedule is built, at step 1206, based upon the non-limiting, representative workload independent and workload dependent considerations described above, the control site transmits, at step 1208, the new beacon schedule to the ground stations of the DSG.

As an illustration, using the above guidance, the beacon schedule allocations for a DSG of 4 ground station would be apportioned as indicated in Table 2. Each ground station gets a minimum of 2 LBAC5 uplinks per Epoch. The remaining 17 are apportioned in proportion to the number of aircraft that are in each domain.

TABLE 2

| | Allocation of beacon Resources (in Each MAC Epoch - 25 MAC Cycles) | | | |
|---|---|---|---|---|
| | GS 1 | GS 2 | GS 3 | GS 4 |
| Traffic Independent MAC cycles | 2 | 2 | 2 | 2 |
| Traffic Dependent MAC cycles | $17 \times N_1/\Sigma N_i$ | $17 \times N_2/\Sigma N_i$ | $17 \times N_3/\Sigma N_i$ | $17 \times N_4/\Sigma N_i$ |

Choosing the Best Ground Station to Communicate with an Aircraft

Figure 1:
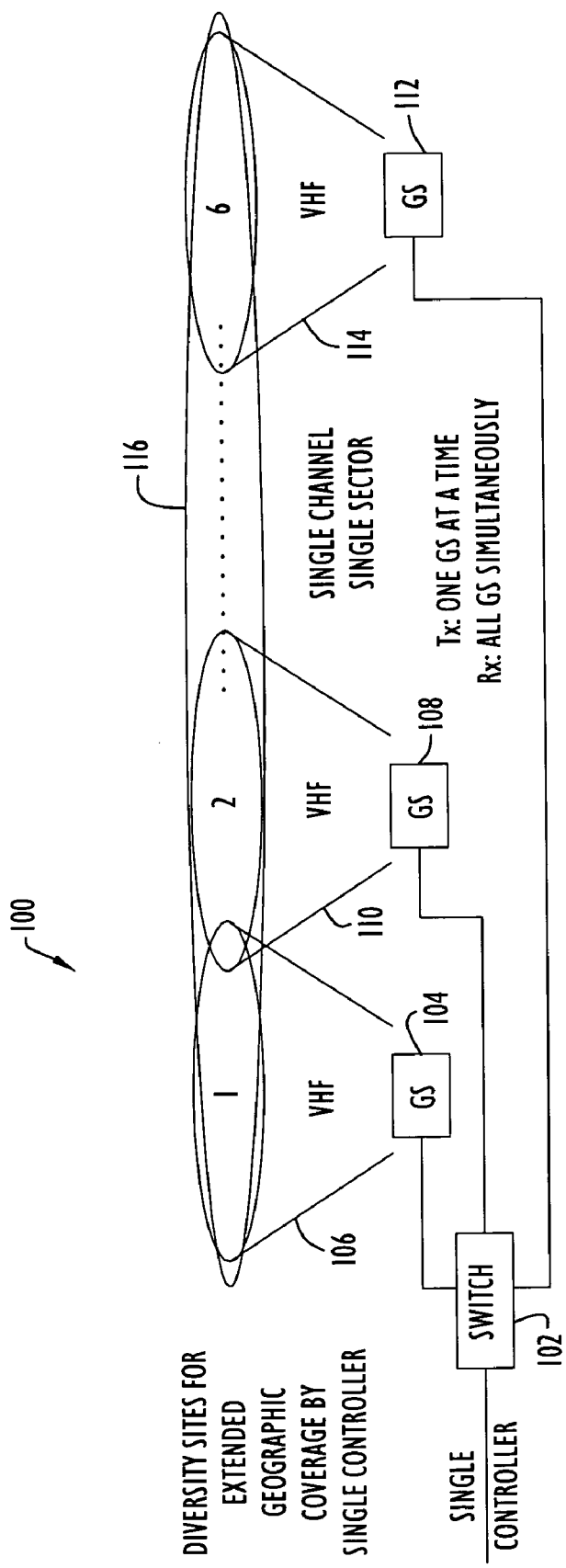
FIG. 1 is a system level diagram depicting a representative DSG.
Figure 2:
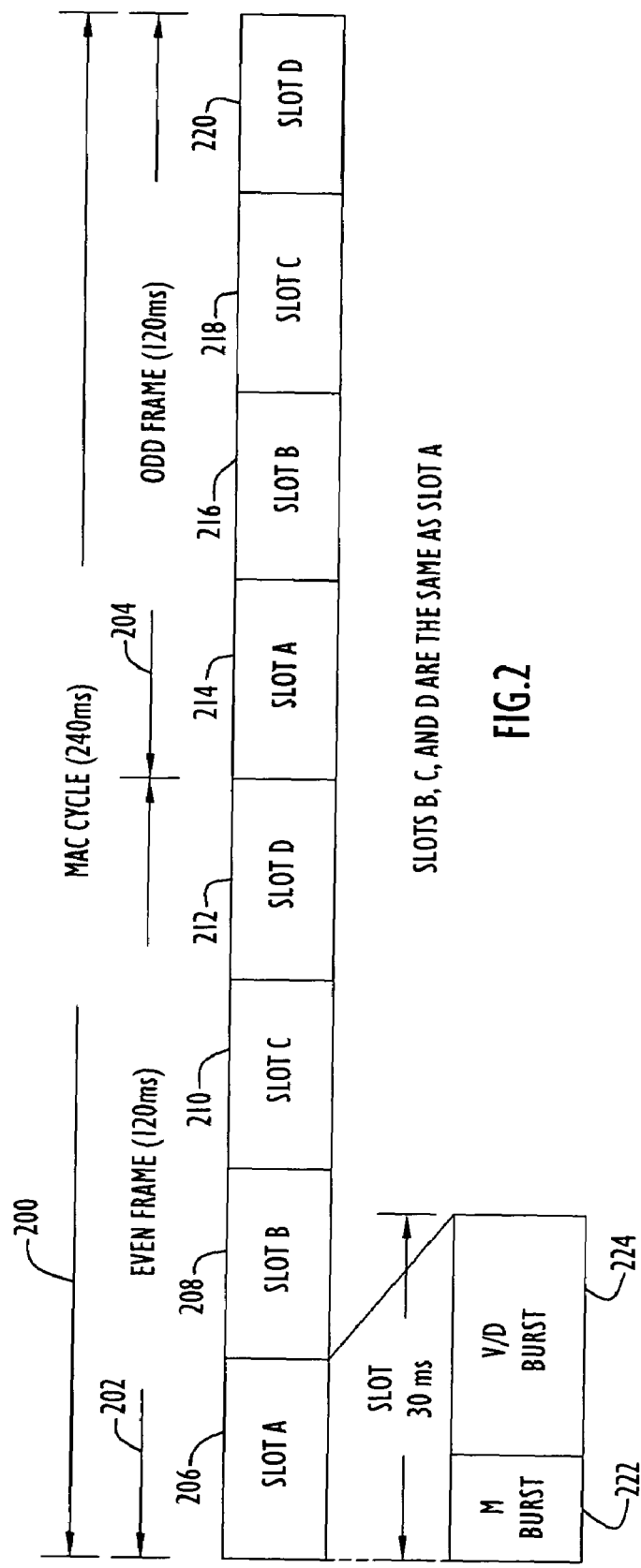
FIG. 2 is a schematic depicting representative TDMA time slots for the VDL Mode 3 communication protocol.
Figure 3:
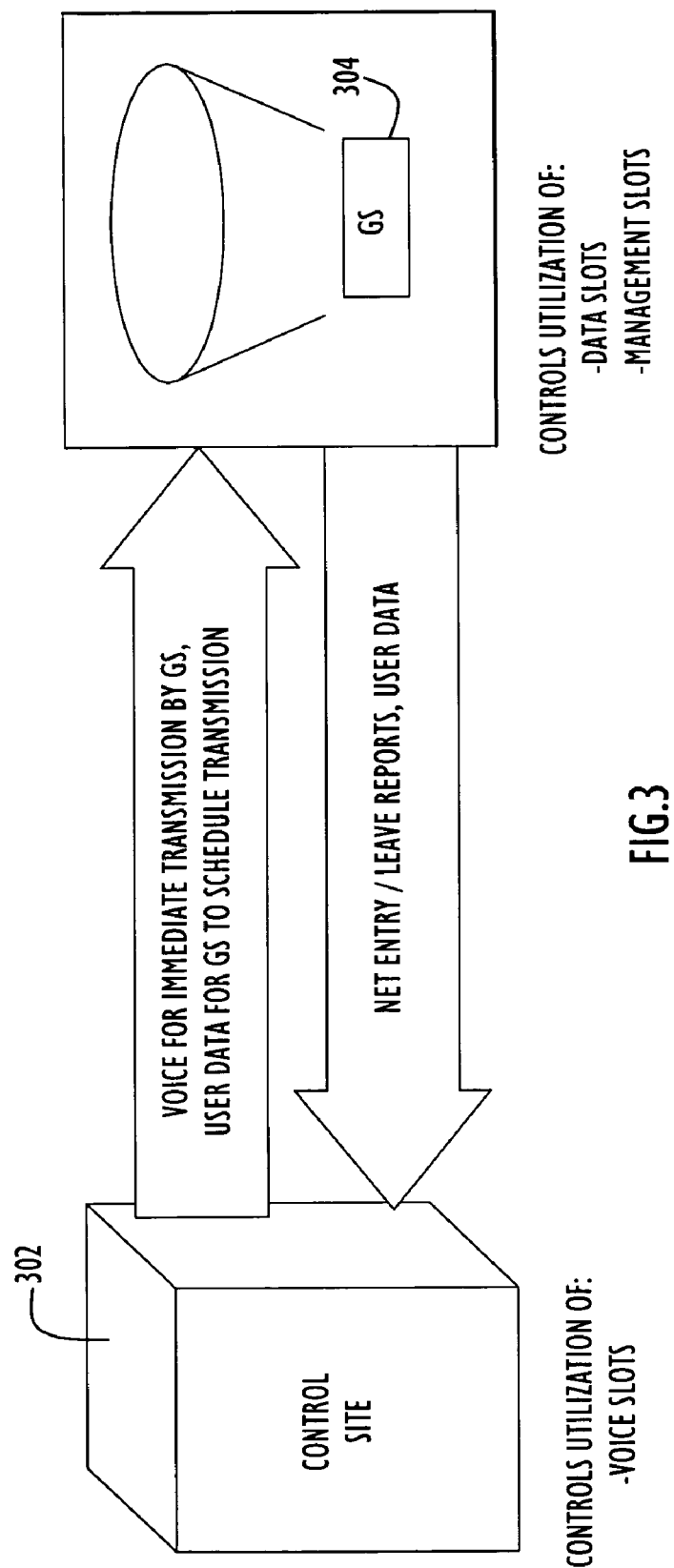
FIG. 3 is a system level block diagram depicting control of VDL Mode 3 transmissions with single ground station.
Figure 4:
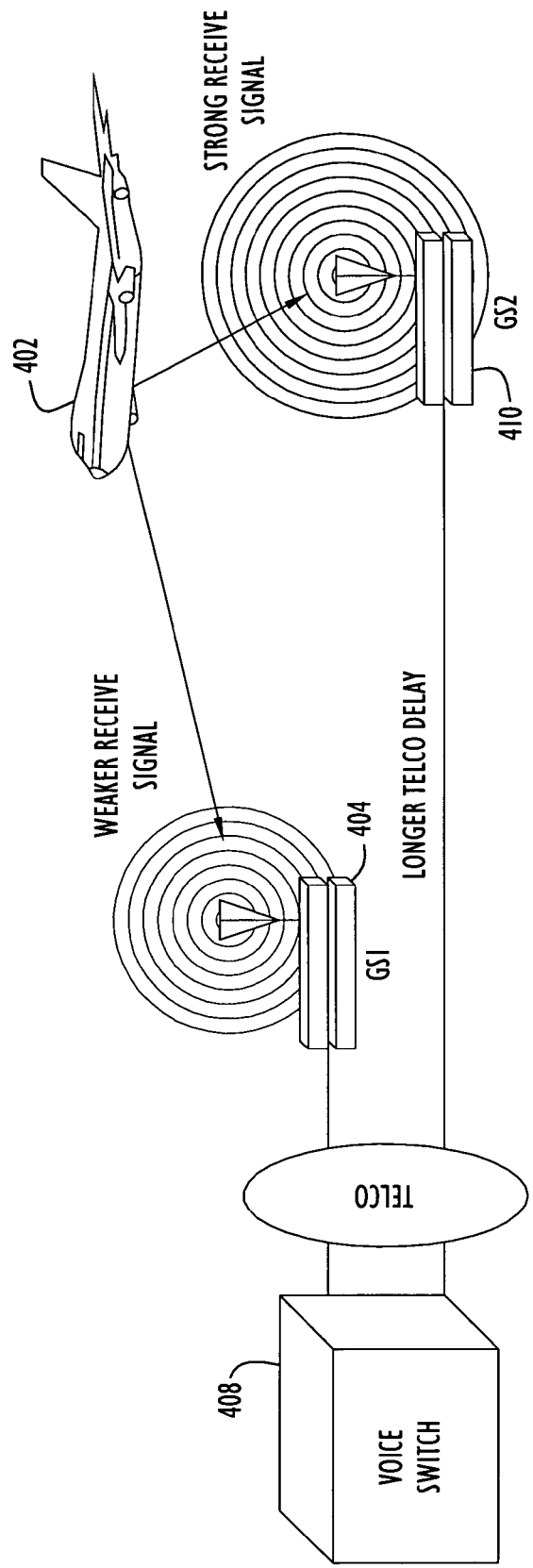
FIG. 4 is a system level diagram depicting selection of a ground station signal by an analog controller switch.

As described with respect to FIG. 4, in conventional A/G communication systems, the controller is often presented with insufficient information by which to intelligently choose which ground station to transmit from and which ground station to receive from. Such conditions result in use of a poor receive and transmit communication path when a good communication path is available.

In a digital system, all M and V/D bursts have a defined preamble that consists of a sequence of known symbols. Radios are designed to record the time-of-arrival (ToA) of an incoming signal. When choosing from among multiple identical signals received at the ground stations of a DSG, the use of ToA information is critical for choosing the best signal. The signal with the earliest ToA is likely to be from the ground station that is closest to the transmitting aircraft. Thus, the choice of the signal with the earliest ToA is typically optimal when combined with signal quality tests such as signal strength and bit-error-rate to ensure that the earliest ToA signal is not weakened or corrupted by multi-path, blockage, or local interference.

Choosing the Best Ground Station to Communicate with an Aircraft by Voice

Comparison of monitored signal quality and time of arrival (TOA) information from multiple ground stations to select a ground station for transmission and/or receipt of A/G communication signals is yet another technique that, in combination with the several techniques described here, supports the use of an integrated digital voice and data communication protocol, such as VDL-3, for A/G communication supported by multiple ground stations as a DSG.

Figure 13:
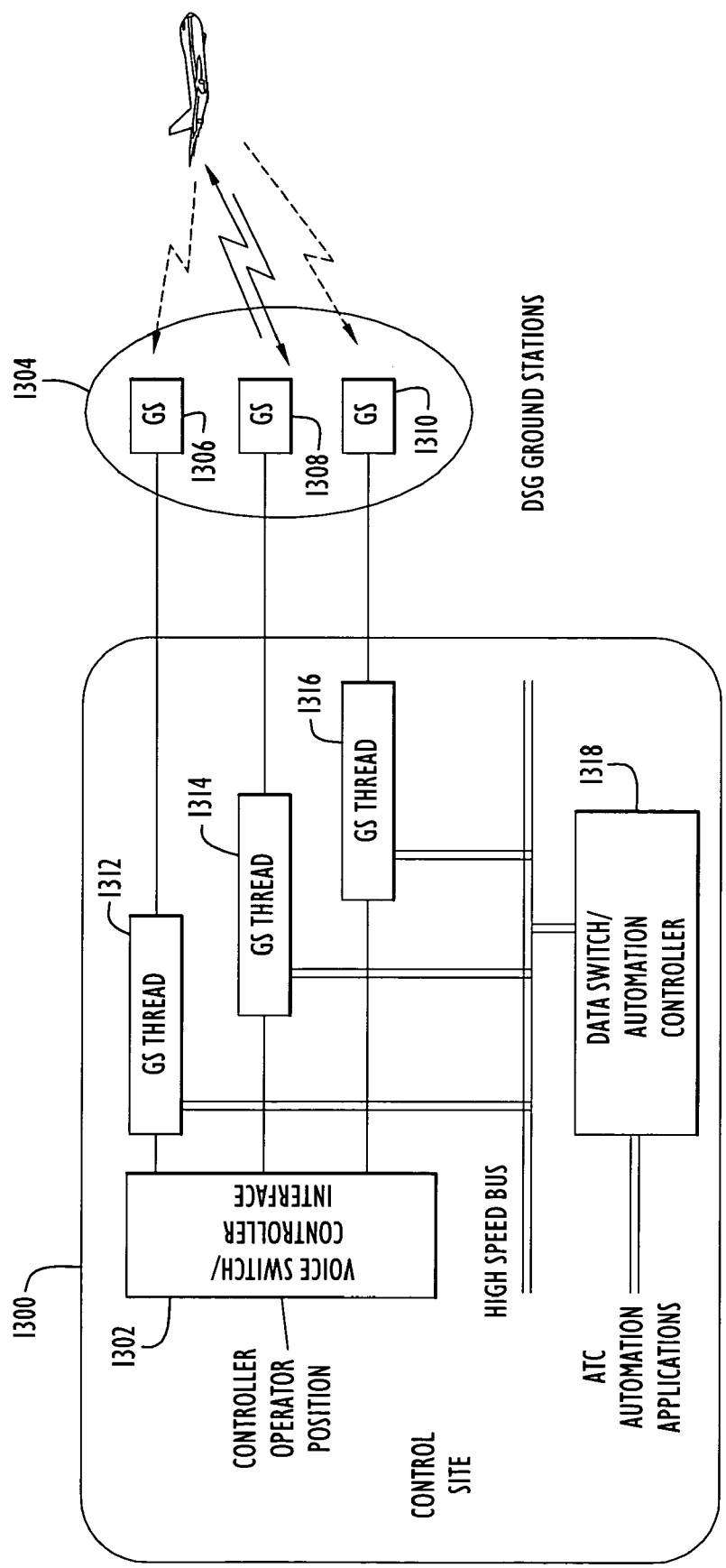
FIG. 13 is a representative communication architecture for conducting DSG communication in a VDL Mode 3 system, in accordance with an exemplary embodiment of the present invention.

FIG. 13 is a representative communication architecture for conducting DSG communication in a VDL Mode 3 system, in accordance with an exemplary embodiment of the present invention. A controller using a VDL-3 DSG control site control system 1300 communicates via a voice switch/controller interface 1302 with the ground stations of a DSG 1304 via communication threads. A data switch/automation controller 1318 controls data communication from various air traffic control (ATC) applications with the ground stations of a DSG 1304 via the same communication threads. As shown in FIG. 13, voice switch 1302 and data switch 1318 communicate with ground station 1306 via ground station thread 1312, with ground station 1308 via ground station thread 1314, and with ground station 1310 via ground station thread 1316.

As described above with respect to the management of DSG unique aircraft identifiers (or addresses), upon assigning an address to an aircraft, the assigning ground station assumes periodic polling responsibility for that aircraft until the aircraft leaves the airspace serviced by that ground station. An assigning ground station periodically polls aircraft to which it has issued addresses. In response to a polling message, a polled aircraft transmits a poll response that is received by all ground stations within the physical polling range of the responding aircraft. In response to receiving a polling response, each receiving ground station generates a signal tracking report (STR) that includes information about the time of arrival (ToA), signal quality, and address of the aircraft transmitting the poll response, and sends the STR to the control site.

STR information received by the control site is used to select the best ground station, and hence ground station thread, to use to communicate with a specific aircraft. Given that the polling process is performed on a repetitive basis, the respective ground stations are able to update the ground station selected for communicating with an aircraft as the aircraft moves through the airspace supported by the DSG.

Figure 14:
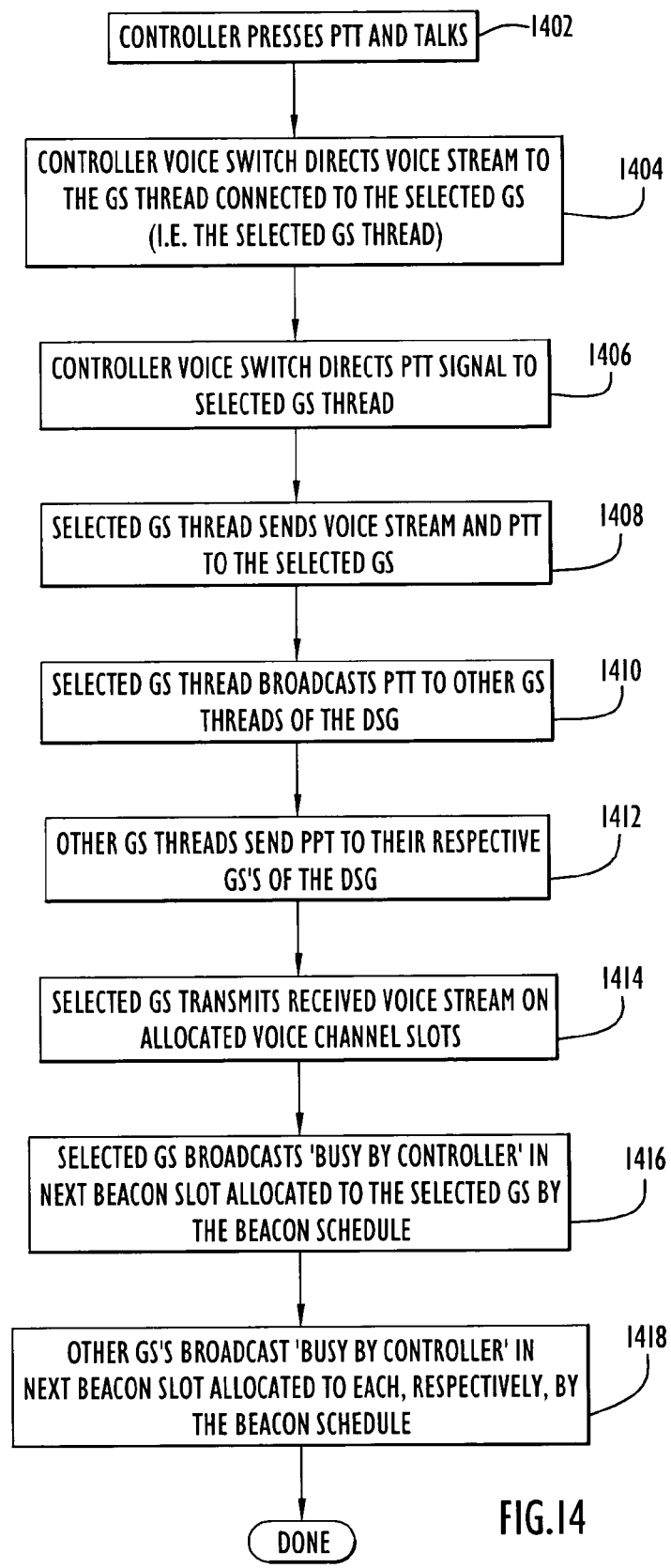
FIG. 14 is a procedural flow-chart illustrating the coordination of outgoing voice communication messages in a DSG, in accordance with an exemplary embodiment of the present invention.

FIG. 14 is a procedural flow-chart illustrating the coordination of outgoing voice communication messages within the representative DSG communication architecture shown in FIG. 13. As shown in FIG. 14, when a controller presses the push to talk (PTT) button at an operator's station and talks, at step 1402, the controller voice switch directs, at step 1404, a voice stream to the ground station thread connected to the currently selected ground station followed by the controller voice switch directing, at step 1406, a PTT signal to the same selected ground station thread. In response, the selected ground station thread sends, at step 1408, the voice stream and PTT to the selected ground station and broadcasts, at step 1410, a PTT to the other ground station threads of the DSG. The other ground station threads then send, at step 1412, a PPT signal to their respective ground stations. In response to receiving a voice stream and PTT from its respective thread, the selected ground station transmits, at step 1414, the received voice stream on allocated voice channel slots and broadcasts, at step 1416, "busy by controller" in the next beacon slot allocated to the selected ground station by the beacon schedule. In response to receiving a PTT from their respective threads, the other ground stations of the DSG transmit, at step 1418, "busy by controller" in the next beacon slot allocated to each, respectively, by the beacon schedule.

Figure 15:
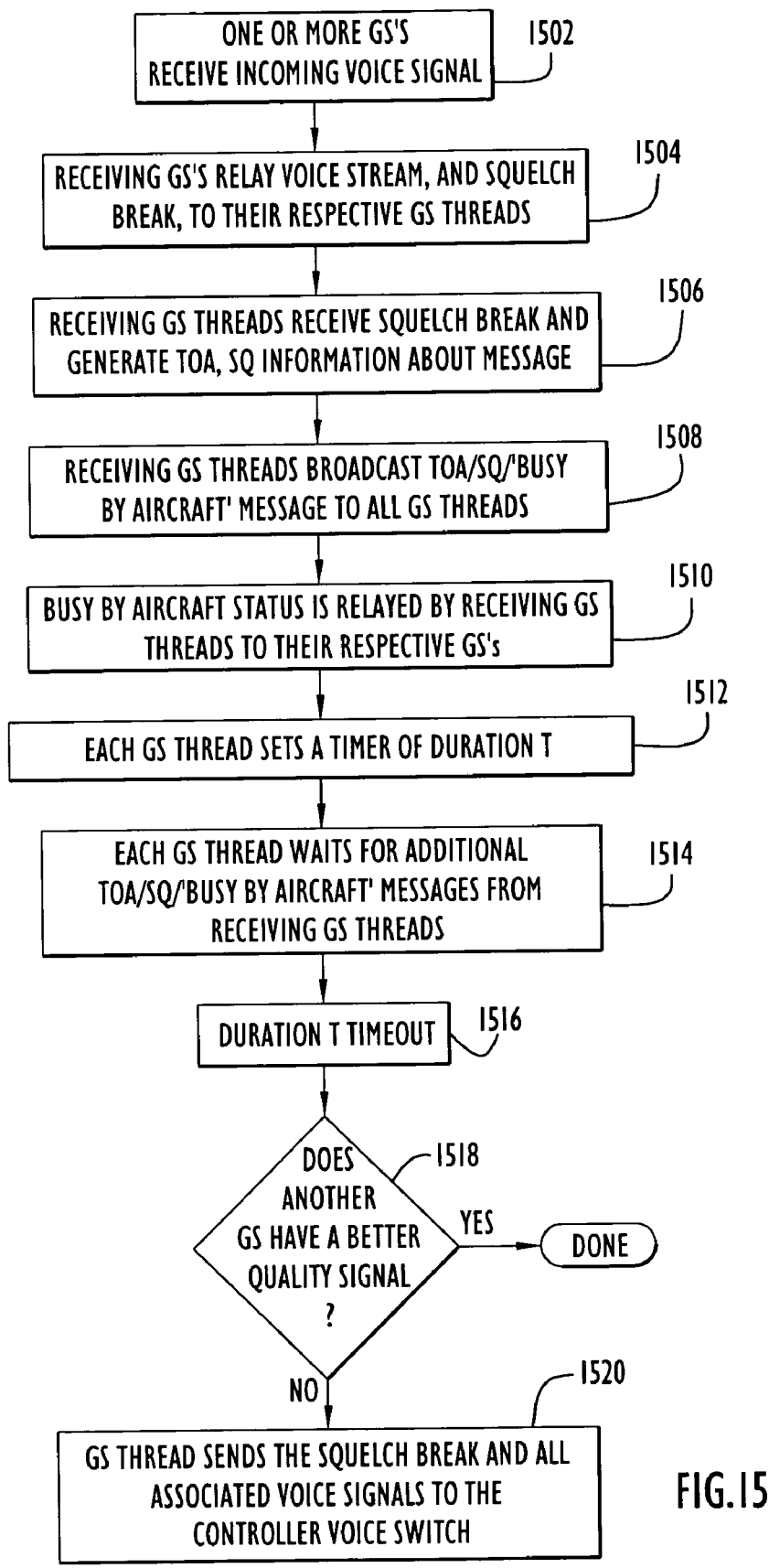
FIG. 15 is a procedural flow-chart illustrating the coordination of incoming voice communication messages in a DSG, in accordance with an exemplary embodiment of the present invention.

FIG. 15 is a procedural flow-chart illustrating the coordination of incoming voice communication messages within the representative DSG communication architecture shown in FIG. 13. As shown in FIG. 15, when one or more ground stations of a DSG receive, at step 1502, an incoming voice signal, the receiving ground stations relay, at step 1504, the voice stream and a squelch break, to their respective ground station threads at the control site. Upon receiving the squelch break, the receiving ground station threads generate, at step 1506, time of arrival (ToA$_{GS}$) at the ground station, time of arrival (ToA$_{GST}$) at the ground station thread, and signal quality (recorded by the ground station radio) based upon the received squelch break and broadcast. At step 1508, the receiving ground station threads broadcast a TOA/SQ/"busy by aircraft" message to all the ground station threads. The broadcasts are relayed, at step 1510, by the respective ground station threads to their respective ground stations. Each ground station thread then sets, at step 1512, a timer of duration $T_w$ and waits, at step 1514, for additional TOA/SQ/"busy by aircraft" messages from other receiving ground station threads.

In one non-limiting representative embodiment, after one GS thread receives a squelch break, the receiving GS thread and all others wait until a time $T=ToA_{GSTearliest}+T_w$, where $ToA_{GSTearliest}$ is the earliest arriving squelch break signal at any ground station thread, and $T_w$ is a fixed or configurable wait time, to receive a squelch break with better SQ/ToA values.

If, upon timeout at step 1518, a ground station thread determines, based upon an assessment of the received TOA/SQ messages, that it has the best TOA/SQ combination, the ground station thread proceeds to send, at step 1520, the squelch signal and all associated voice signals to the controller voice switch. Alternatively, if, upon timeout at step 1518, a ground station thread determines that it does not have the best TOA/SQ combination, based upon an assessment of the received TOA/SQ messages, the ground station thread ceases to process the voice message.

Data Slot Scheduling and Utilization

Management of data slots for transmission and/or receipt of A/G data communication signals is yet another technique that, in combination with the several techniques described here, supports the use of an integrated digital voice and data communication protocol, such as VDL-3, for A/G communication supported by multiple ground stations as a DSG.

Figure 16:
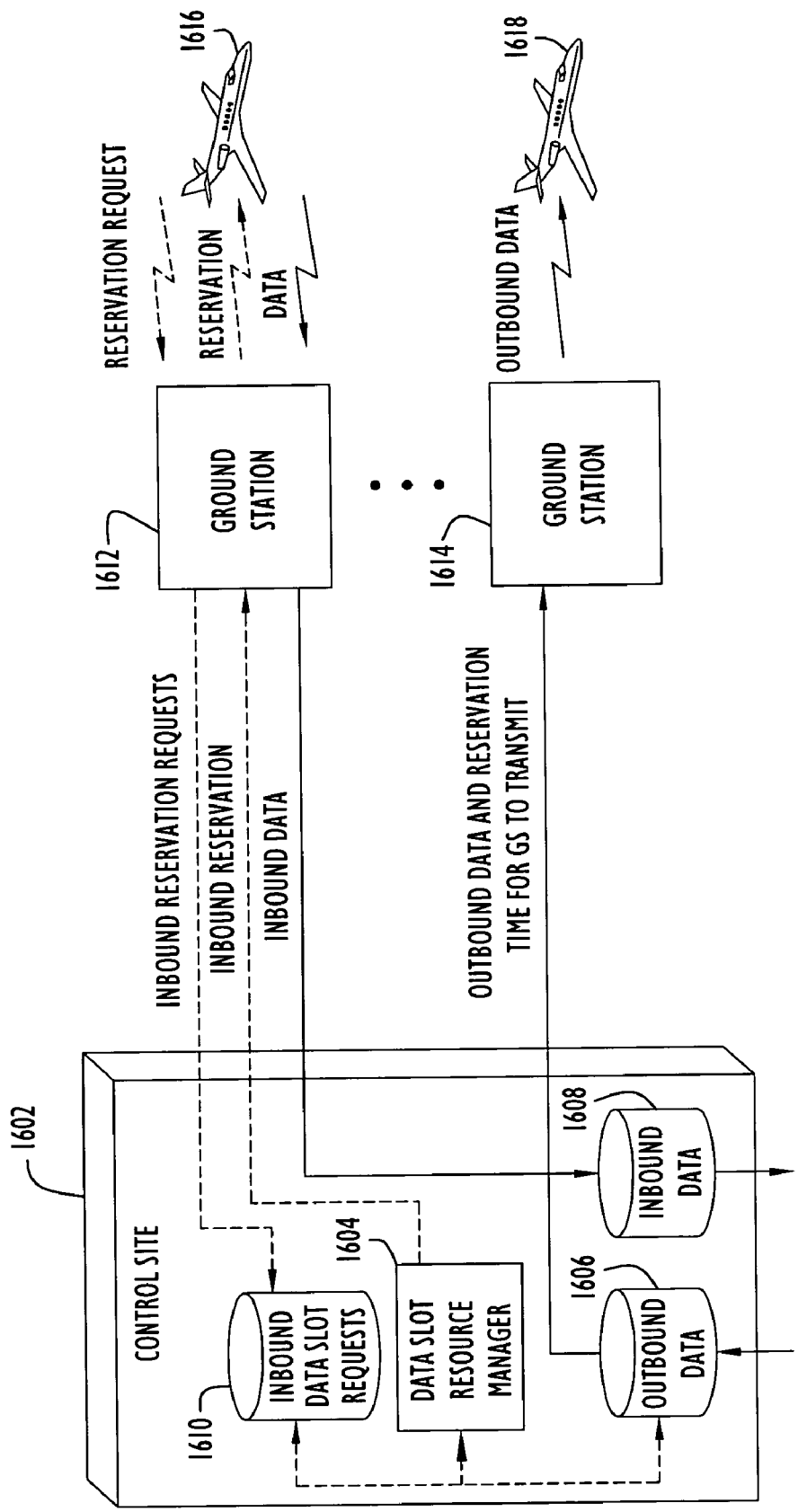
FIG. 16 is a system level block diagram depicting data slot scheduling and utilization in a VDL Mode 3 system, in accordance with an exemplary embodiment of the present invention.

FIG. 16 is a system level block diagram depicting data slot scheduling and utilization in a VDL Mode 3 system, as described here. As shown in FIG. 16, a control site control system 1602 uses a data slot resource manager (DSRM) 1604 to coordinate the transmission of outbound data 1606 and the receipt of inbound data 1608 to/from the ground stations of the DSG. As previously described, inbound and outbound data for the DSG share the same time slots. The control site DSRM 1604, therefore, keeps track of inbound data slot requests from the aircraft and the volume and priority of outbound data to the aircraft. The DSRM uses these inputs to schedule data slots for inbound and outbound data.

Referring again to FIG. 16, the control site receives inbound reservation requests from an aircraft 1616 via a ground station 1612 of the DSG, and stores the inbound reservation request in an inbound data slot request information base 1610. Based upon the volume and priority of inbound data slot requests 1610 and the volume and priority of outbound data 1606, the DSRM transmits an inbound data slot reservation for a set of slots to aircraft 1616 via ground station 1612. In response, aircraft 1616 sends a data stream to the control site as a payload on the data slots reserved for use by aircraft 1616 in the inbound reservation.

Likewise, transmission of outbound data is also based upon the volume and priority of inbound data slot requests 1610 and the volume and priority of outbound data 1606. Data slots that are not reserved by an inbound reservation, as described above, can be used by the control site to transmit outbound data. As shown in FIG. 16, control site transmits outbound data 1606 to a selected ground station 1614 for transmission along with a reservation for a sufficient number of data slots to transmit the outbound data to aircraft 1618.

Figure 17:
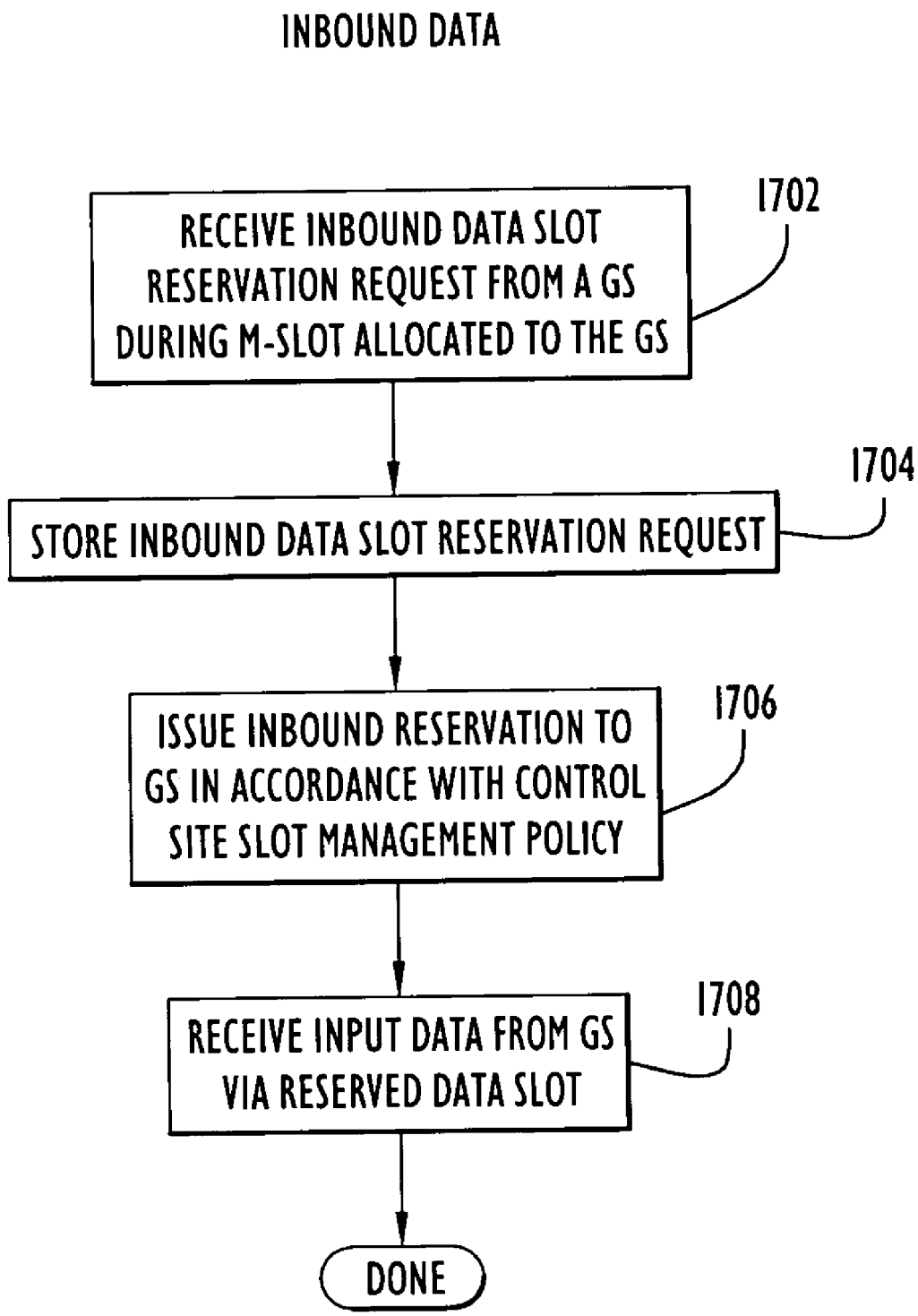
FIG. 17 is a procedural flow-chart illustrating the coordination of outgoing data communication messages in a DSG, in accordance with an exemplary embodiment of the present invention.

FIG. 17 is a procedural flow-chart illustrating the coordination of outgoing data communication messages within the DSG system shown in FIG. 16. As shown in FIG. 17, a control site receives, at step 1702, an inbound data slot request from a ground station during an m-slot allocated to the ground station and stores, at step 1704, the inbound data slot reservation request. In response, the control site issues to the requesting aircraft, at step 1706, an inbound reservation in accordance this a control site slot management policy based upon the volume and priority of outbound data and inbound reservation requests, as described above. Finally, at step 1708, the control site receives inbound data from the aircraft on the reserved data slots via a ground station, selected based upon TOA and signal quality characteristics, as described above.

Figure 18:
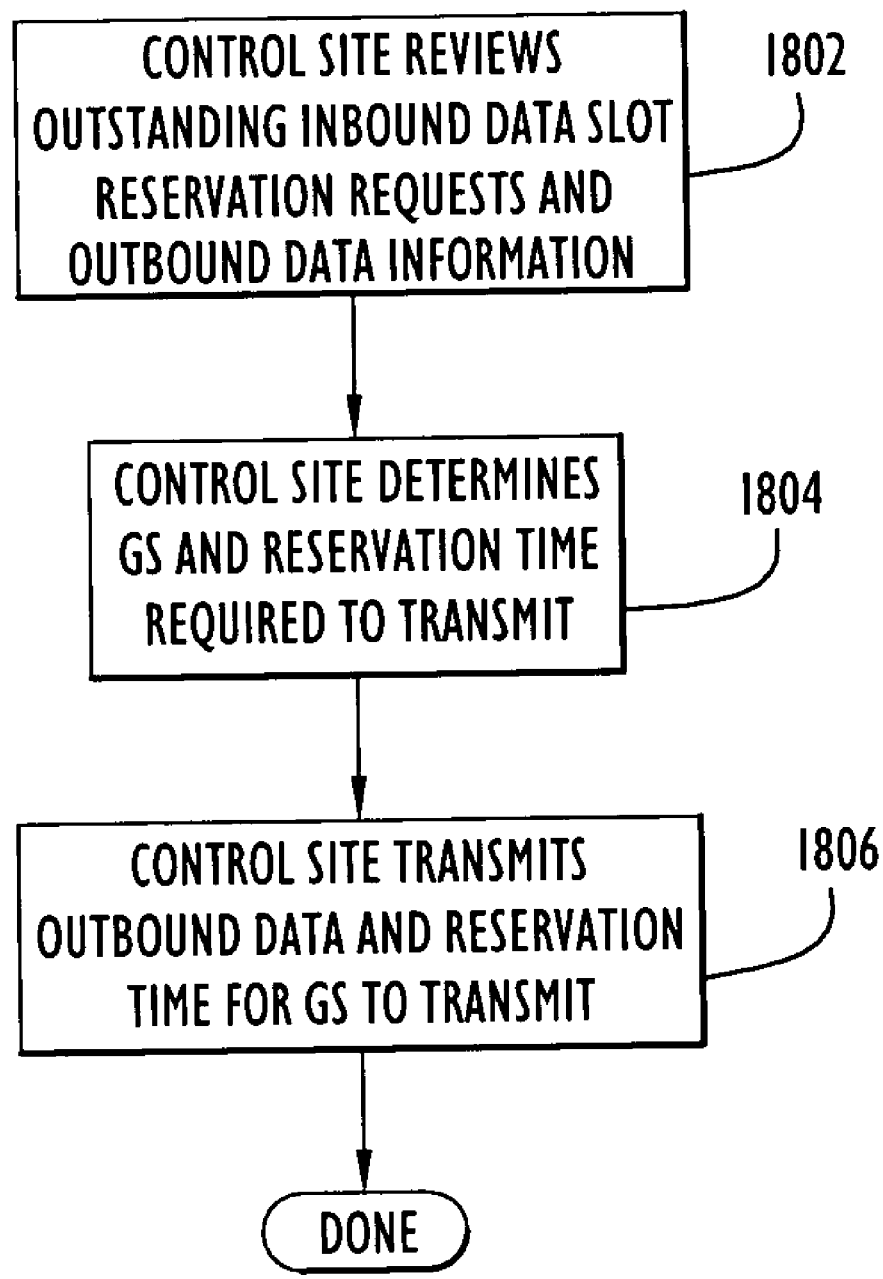
FIG. 18 is a procedural flow-chart illustrating the coordination of incoming data communication messages in a DSG, in accordance with an exemplary embodiment of the present invention.

FIG. 18 is a procedural flow-chart illustrating the coordination of outbound data communication messages within the DSG system shown in FIG. 16. As shown in FIG. 18, a control site reviews, at step 1802, outstanding inbound data slot reservation requests and the priority and volume of outbound data. Based upon its review the control site determines, at step 1804, an appropriate transmit time and selects an appropriate ground station for transmitting the outbound data, as previously described. The control site then transmits to the selected ground station, at step 1806, the outbound data and a reservation for an appropriate number of data slots in which to transmit the data.

Aircraft Monitoring and Tracking

Monitoring and tracking of aircraft A/G communication status amongst the respective ground stations of the DSG is yet another technique that, in combination with the several techniques described here, supports the use of an integrated digital voice and data communication protocol, such as VDL-3, for A/G communication supported by multiple ground stations as a DSG.

As described above, a DSG control site tracks and monitors aircraft supported by the ground stations of the DSG using several techniques. These techniques include: assigning a unique address to each aircraft that enters the DSG; repetitively polling each aircraft assigned a unique address; and monitoring, and tracking TOA/SQ information received in signal tracking reports (STR's) received from the respective ground stations of the DSG in response to each issued poll request.

Each aircraft supported by a DSG is assigned to a ground station of the DSG as part of the control site's unique ID (or address) management process, as previously described. Each of the ground stations of the DSG periodically polls its assigned aircraft and receives and acts upon the responses it receives from the aircraft. As an individual aircraft moves about, the aircraft times its transmission based upon beacon bursts transmitted by the respective ground stations of the DSG. In accordance with the VDL 3 specification, an aircraft does not accept any beacon burst that arrives later than 1 symbol. Thus, the aircraft always maintains its time in synchronization with the closest ground stations from which it receives a signal.

Figure 19:
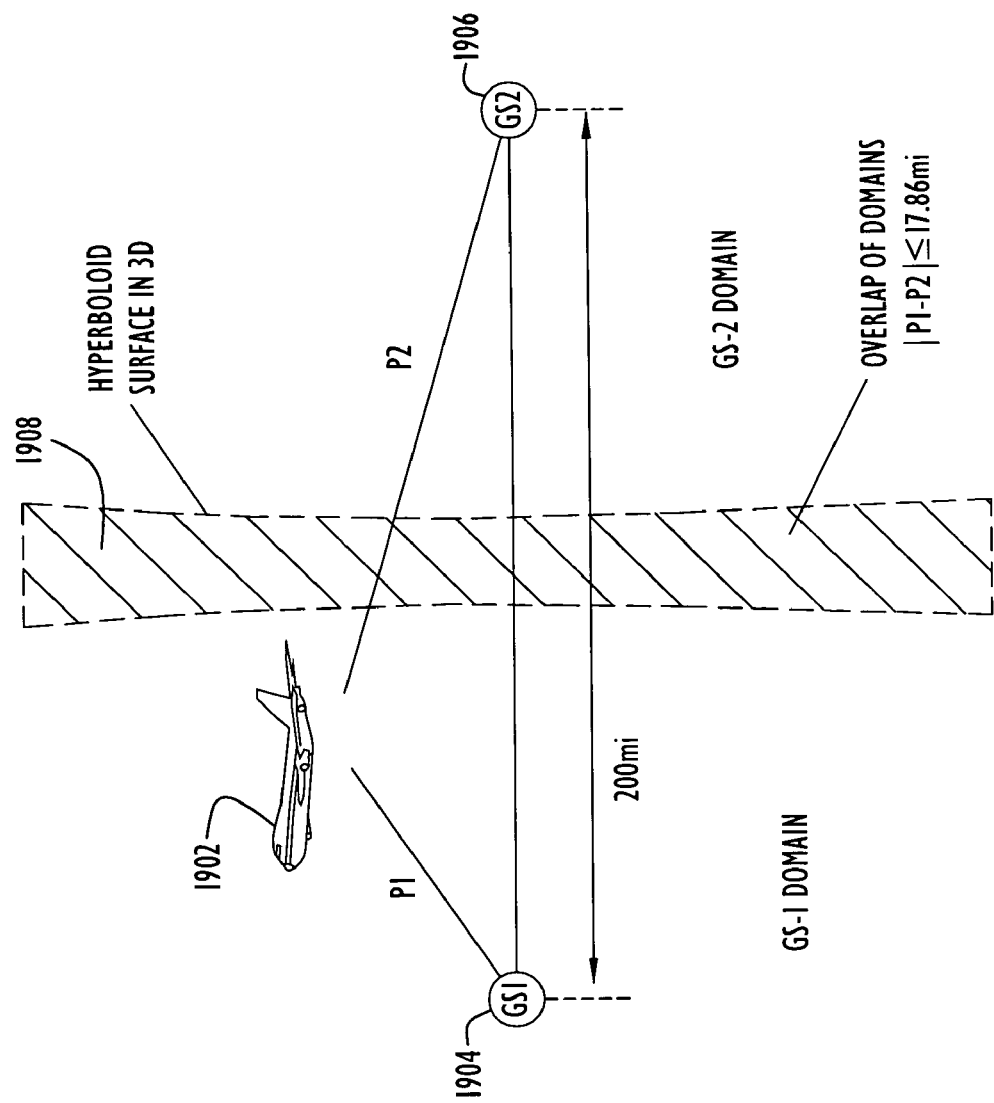
FIG. 19 is an illustrative depiction of an air/ground handover region.

FIG. 19 illustrates which ground stations an aircraft will use timing information from. As shown in FIG. 19, aircraft 1902 in domain GS-1 uses only the beacon from ground station 1 (GS1), shown at 1904, because the beacon from ground station 1 (GS2), shown at 1906, arrives later than 1 symbol. Similarly, in the GS-2 domain aircraft 1902 uses timing from GS2 because the beacon from GS1 arrives later than 1 symbol.

In the overlap region 1908, between the GS-1 and GS-2 domains, aircraft 1902 uses the timing from both ground stations. Because a ground station rejects all communications greater than a symbol offset, a ground station must be closely timed to an aircraft in order to communicate with it. Thus, only GS1 can communicate with aircraft 1902 in the GS-1 domain, only GS2 can communicate with aircraft 1902 in the GS-2 domain, but both GS1 and GS2 can communicate with aircraft 1902 in the overlap region 1908.

Handover of an aircraft from one ground station of a DSG to another ground station of the DSG, as described with respect to FIG. 8 and FIG. 9 in association with the management of unique aircraft addresses and the assignment of aircraft polling responsibility, should be performed within overlap area 1908 in order to maintain continuity of communication between the aircraft and the control site of the DSG. As shown in FIG. 19, the overlap area 1908 is roughly a 3-dimensional hyperboloid centered half-way between GS1 and GS2. Assuming that the distance from aircraft 1902 to GS1 is P1 miles and the distance from aircraft 1902 to GS2 is P2 miles, the volumetric area of overlap area 1908 can be described as all points between GS1 and GS2 at which the absolute value of the difference between the distance P1 and the distance P2 is less than or equal to 17.86 miles.

Figure 20:
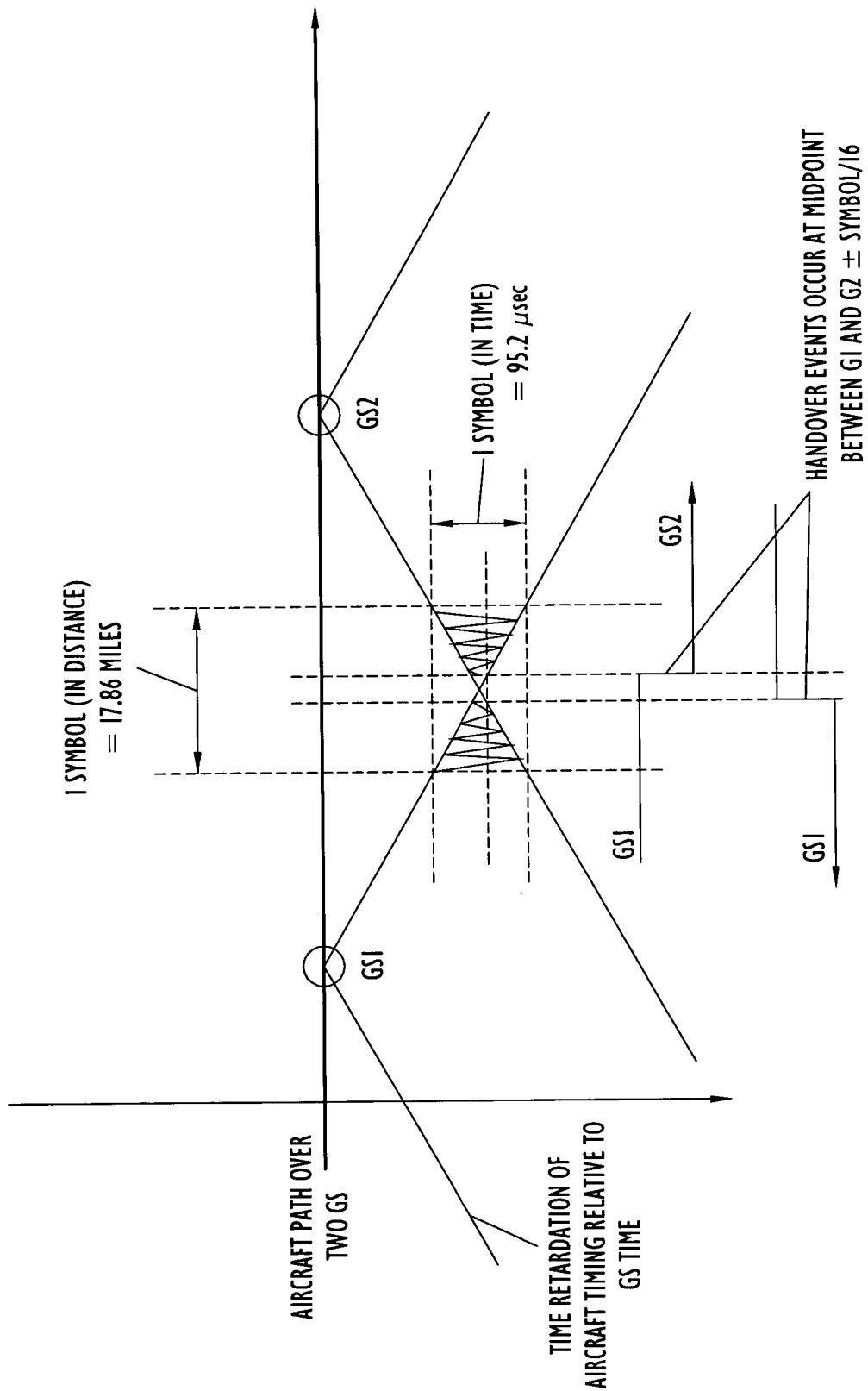
FIG. 20 is an illustrative depiction of time retardation of aircraft timing relative to ground station time in the handover region.

FIG. 20 illustrates how aircraft timing advances and retards relative to a transmitting ground stations as an aircraft moves between ground stations. For example, as an aircraft moves from left to right in FIG. 20, the aircraft's timing relative to GS1 advances due to decreased signal propagation delay as the distance between the aircraft and GS1 diminishes. As the aircraft passes GS1, the distance between the aircraft and GS1 increases, and the aircraft's timing relative to GS1 retards. As the aircraft moves closer to GS2, the path difference to GS1 and GS2 equals one symbol and the aircraft alternately receives timing information from each ground station. Thus, the aircraft's timing will advance and then retard by one symbol. As the path difference approaches zero, the toggling of timing will be a decreasing fraction of a symbol. When the halfway point is reached, the toggling of aircraft timing will be an increasing fraction of a symbol. Finally, as the aircraft moves further from GS1, the aircraft will be timed only to GS2.

Aircraft Handovers and Routing of Addressed Messages

Positive control of aircraft A/G communication responsibilities amongst the respective ground stations of the DSG is yet another technique that, in combination with the several techniques described here, supports the use of an integrated digital voice and data communication protocol, such as VDL-3, for A/G communication supported by multiple ground stations as a DSG.

Figure 21:
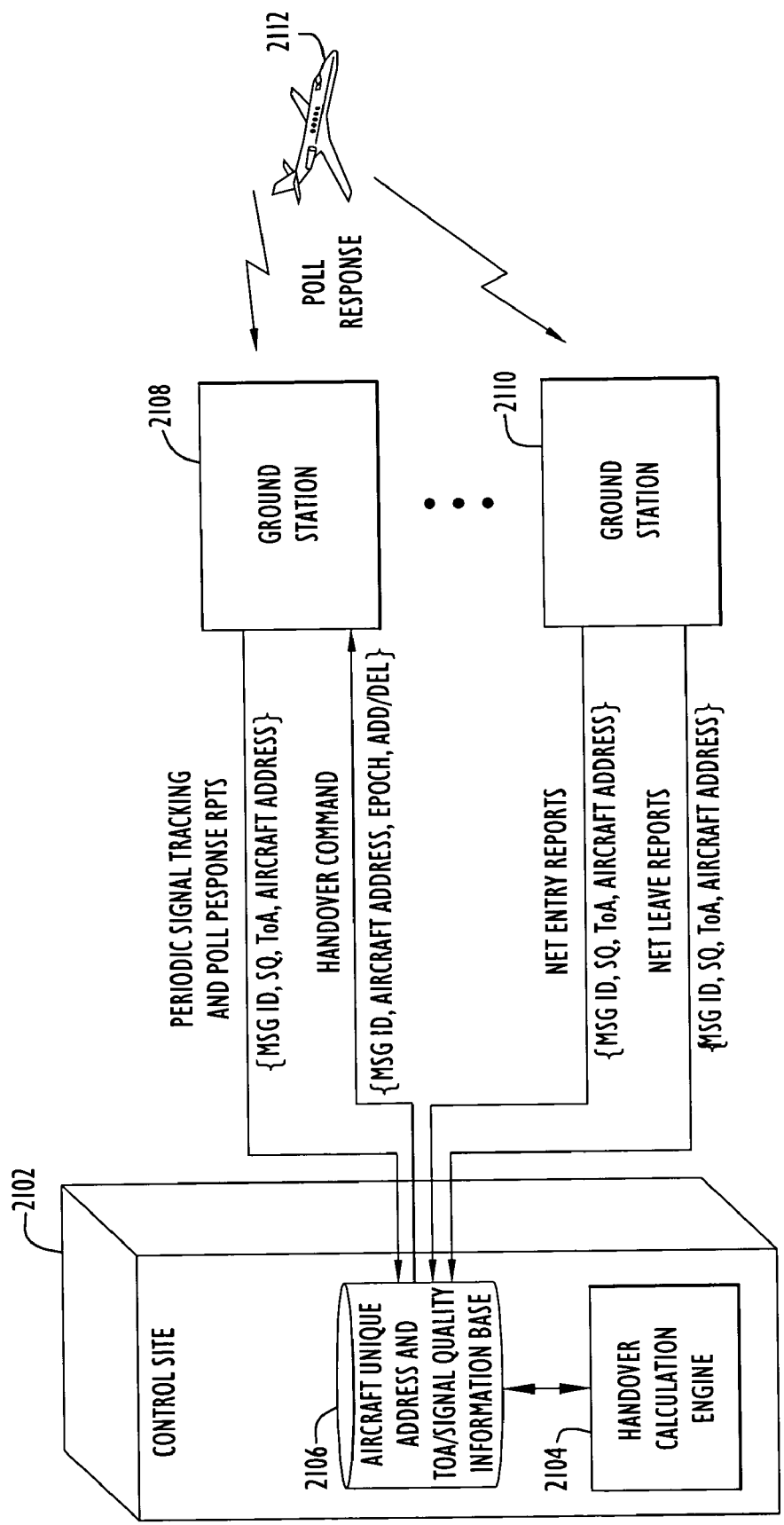
FIG. 21 is a system level block diagram depicting data flows used to track and coordinate communication handovers between ground stations in a DSG in accordance with an exemplary embodiment of the present invention.

FIG. 21 is a system level block diagram that summarizes data flows used to track and coordinate communication handovers of aircraft between ground stations in a DSG. Based upon the information contained in information base 2106, a control site control system 2102 keeps track of the location of all aircraft within the domains of each ground station of the DSG. The control site therefore has all the information needed to select a ground station to route information addressed to a specific aircraft by selecting the ground station that is currently in contact and with the aircraft based upon information contained in information base 2106.

As shown in FIG. 21, a control site control system 2102 uses a handover calculation engine 2104 with access to an information base 2106 that contains information on active aircraft supported by the DSG. Referring to FIG. 21, the control site 2102 receives net entry reports, net leave reports and periodic STR's from ground station 2108 and ground station 2110 and stores the data contained within in information store 2106. Each aircraft supported by the DSG, represented in FIG. 21 by aircraft 2112 has an assigned unique identifier (or address) that is associated with each of the messages. For example, as shown in FIG. 21, STR messages received from multiple ground stations in response to an active aircraft responding to an aircraft specific poll request, contain the aircraft's unique address, a message identifier, and signal quality information and time of arrival (TOA) information. Net entry and net leave reports, contain similar information. The control site uses aircraft addresses and message identifiers to organize and correlate data contained in information base 2106. In one non-limiting, representative embodiment, for example, the information base 2106 includes aircraft unique identifiers (or addresses), TOA information, signal quality information and other data maintained by the control site based upon information received in association with aircraft address management (previously described with respect to FIGS. 8 and 9) and signal tracking and poll response reports (STR's) received from the respective ground stations in response to ground station polling of active aircraft, as described above.

The handover calculation engine 2104 uses the data contained in information base 2106 to determine the need and timing for a handover. Upon determination that a handover of an aircraft is required from one ground station of the DSG to another ground station of the DSG, the handover calculation engine transmits a handover command to the two ground stations involved: the ground station that currently has the responsibility to poll the aircraft, and the ground station to which the responsibility will be transferred.

Figure 22:
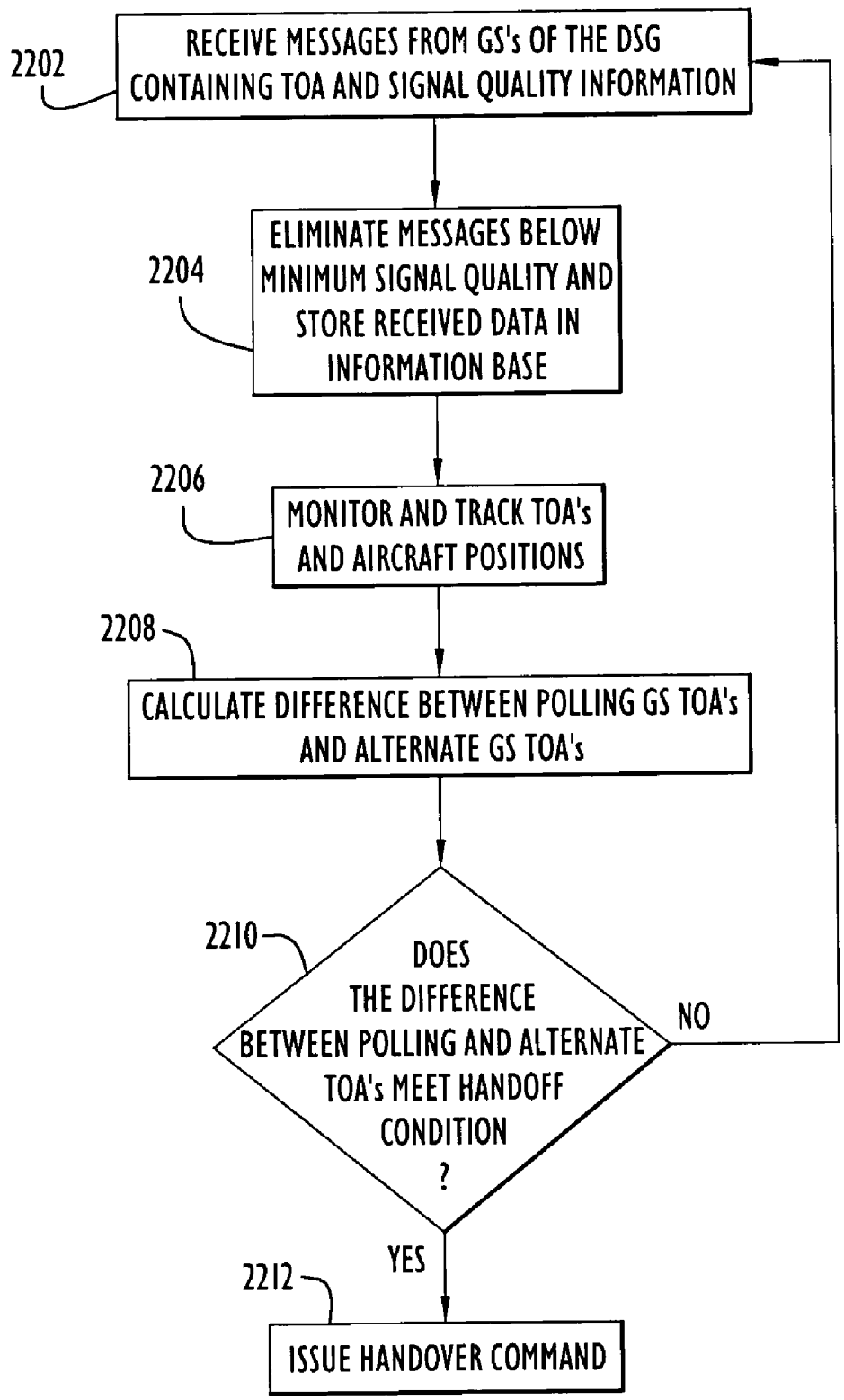
FIG. 22 is a procedural flow-chart illustrating the coordination of aircraft handovers between the ground stations of a DSG, in accordance with an exemplary embodiment of the present invention.

FIG. 22 is a procedural flow-chart illustrating the coordination of aircraft handovers between the ground stations within the representative DSG system shown in FIG. 21. The control site receives, in step 2202, messages from the ground stations of the DSG that include TOA and signal quality information. The control site eliminates, in step 2204, messages below a minimum signal quality and stores the received data in an information base. The information stored in the information base is correlated based upon aircraft address, as described above, and the control site uses the stored information to monitor and track, in step 2206, aircraft TOA's and positions. As part of the monitoring process, the control site calculates, in step 2208, the difference between the TOA's associated with an aircraft reported by the ground station with current polling responsibility for the aircraft and an alternate ground stations. If, in step 2210, the difference between TOA's of the polling ground station and the TOA's of an alternate ground station meets a handoff condition, the control site issues, in step 2212, a handover command, otherwise, the control site continues to receive additional update messages, at step 2202, without issuing a handover command.

In one non-limiting, representative embodiment, the handover calculation engine determines when to issue handover commands, in step 2210, by calculating $\text{ToA}_{current}-\text{ToA}_{alternate}$ for all signals received from a ground station that pass a test for signal quality. Where $GS_{current}$ is the ground station with current polling responsibility and $GS_{alternate}$ is an alternate ground station that is sending STRs. When $\text{ToA}_{current}-\text{ToA}_{alternate} \geq \text{one\_symbol\_duration}/8$, the handover calculation engine 2104 issues a handover command that transfers polling responsibility from the current ground station to the alternate ground station.

By setting the handover threshold to a non zero value (e.g., "one_symbol_duration/8" in the above example) the handover calculation engine provides a degree of hysterisis that ensures the stability of handovers at the boundary between the domains of two adjacent ground stations. The handoff that results from this algorithm typically occurs while the aircraft is accepting beacon timing information from both G1 and G2, as described with respect to FIG. 20.

The signal quality tests, referred to above, ensure that the signal strength and bit-error rate meet a minimum predefined standard. In VDL Mode 3, the M-burst messages implement Golay channel coding. Thus, the GS is able to generate a signal quality estimate based upon detected errors. For example, a 1-bit signal quality estimate would note whether the M-burst was received error free or not, in accord with the Golay decoding.

Figure 23:
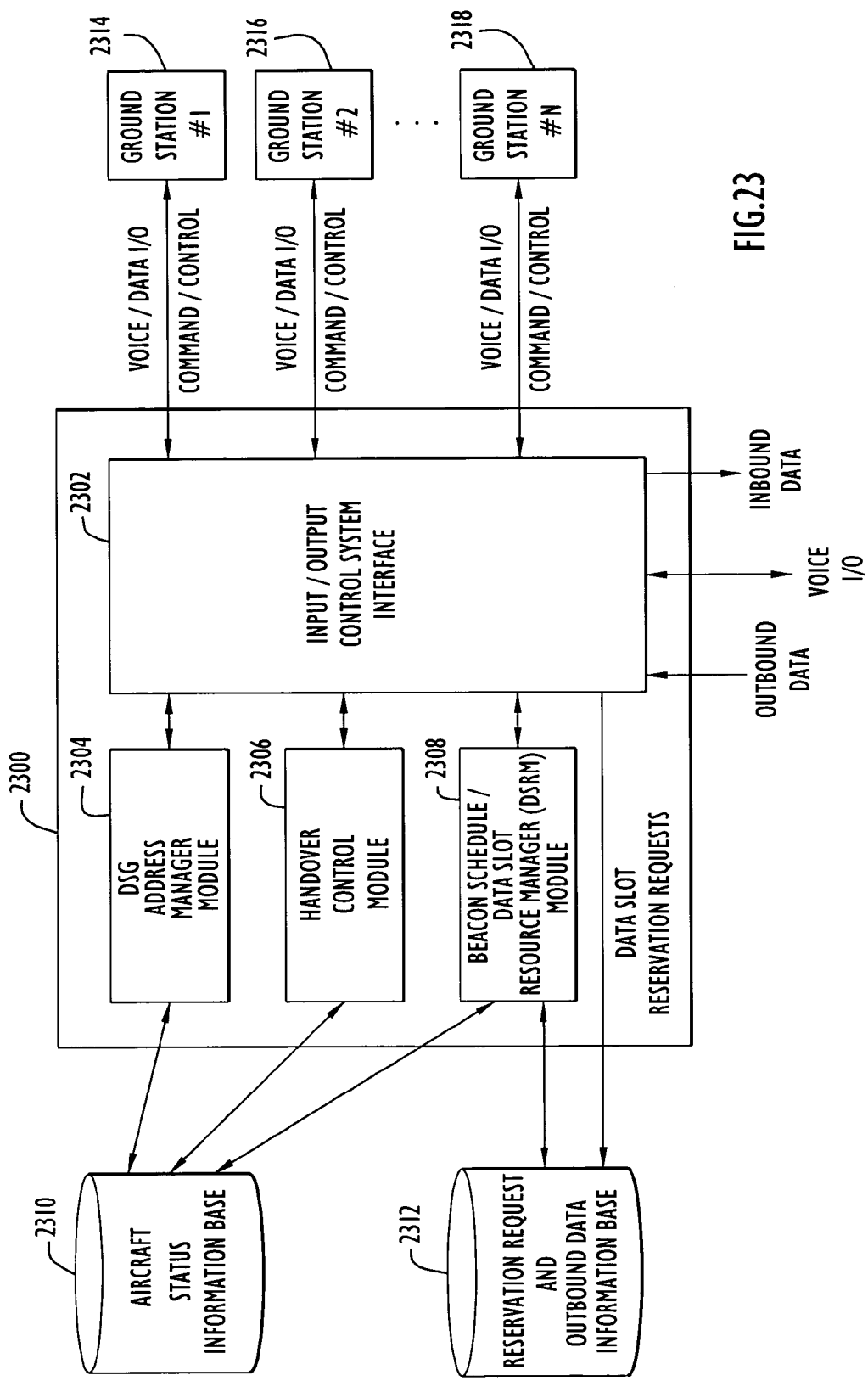
FIG. 23 is a system level block diagram of a VDL-3 DSG control site control system used to coordinate communication with aircraft via the VDL-3 ground stations of the DSG in accordance with an exemplary embodiment of the present invention.

FIG. 23 is a system level block diagram of a novel VDL-3 DSG control site control system 2300 used to coordinate communication with aircraft via the novel VDL-3 ground stations of the DSG described here. As shown in FIG. 23, a control site control system 2300 includes an input/output control system interface 2302 that supports voice, data, and command/control communications to a airspace supported by a DSG via the ground stations of the DSG (represented in FIG. 23 as ground station 2314, ground station 2316 and ground station 2318). To coordinate the multiple ground stations of the DSG in support of A/G communication, the input/output control system interface 2302 communicates at the control site with a DSG address manager module 2304, a handover control module 2306, and a beacon schedule/data slot resource manager (DSRM) module 2308. All three modules provide input to and retrieve data from an aircraft status information base 2310 that serves as a repository for tracking assigned and unassigned unique aircraft addresses, and for storing TOA and signal quality information received via STR's and other messages, as described above. A reservation request and outbound data information base 2312 serves as a repository for data reservation requests from aircraft supported by the DSG as well as outbound data awaiting transmission to aircraft supported by the DSG.

The reservation request and outbound data information base 2312 supports the beacon schedule/data slot resource manager (DSRM) module 2308 by serving as a repository of inbound data slot requests and outbound data information for use in managing inbound and out bound data traffic, as described with respect to FIG. 16, FIG. 17 and FIG. 18, above.

The aircraft status information base 2310 contains all information needed to represent the current status of the DSG, including: current/past beacon schedules; aircraft address assignment information; the current selected ground station for transmitting to each aircraft supported by the DSG; the number/identities of aircraft assigned to each ground station of the DSG; and handover control parameters. Information base 2310 also supports the DSG address manager 2304 by serving as a repository of common assigned/unassigned addresses, as described with respect to FIG. 8 and FIG. 9, above. Information base 2310 supports the beacon schedule/data slot resource manager (DSRM) module 2308 by serving as a repository of status information used to redefine beacon schedules based upon traffic load, as described with respect to FIG. 10, FIG. 11 and FIG. 12, above. In addition, information base 2310 supports the handover control module 2306 by serving as a source of TOA and related information for controlling aircraft handovers, as described with respect to FIG. 21 and FIG. 22, above.

Figure 24:
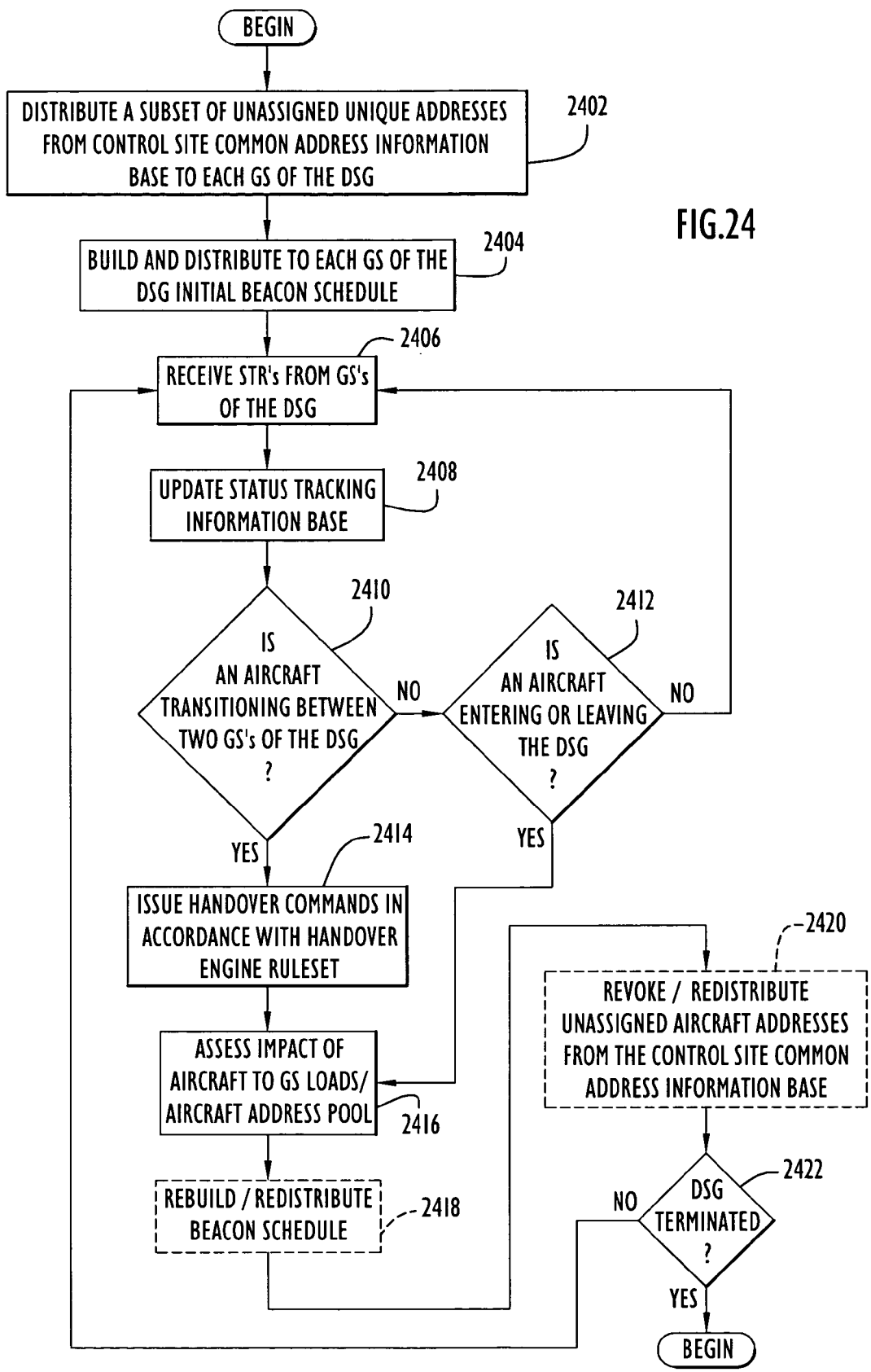
FIG. 24 is a procedural flow-chart illustrating operation of a VDL-3 DSG control site control system, in accordance with an exemplary embodiment of the present invention.

FIG. 24 is a procedural flow-chart illustrating operation of the VDL-3 DSG control site control system 2300 depicted in FIG. 23. As shown in FIG. 24, upon initiation of a DSG, the DSG control site control system 2300, at step 2402, distributes a subset of unallocated unique addresses from the control site aircraft status information base 2310 to each of the ground stations of the DSG. Next, at step 2404, the control site control system 2300 builds and distributes an initial beacon schedule to each of the ground stations of the DSG. Until termination, at step 2422, the control site control system (or control site) executes an operational loop in which, at step 2406, the control site receives STR's and other messages from the ground stations of the DSG and, at step 2408, uses the information contained within the received message to update the aircraft status information base 2310, with revised TOA and signal quality information. If, based upon the TOA information received and handover criteria described above, the control site determines that an aircraft is transitioning between two ground stations of the DSG, at step 2410, the control site issues, at step 2414, handover commands in accordance with the handover calculation ruleset described above with respect to FIG. 21 and FIG. 22. Next, the control site assesses, at step 2416, the impact of the aircraft handover to ground station traffic loads and to the aircraft address pool and based upon the assessed impact optionally rebuilds and redistributes, at step 2418 (shown in broken lines to indicate that the step is performed only when the control site determines that the step is necessary, as described above), a new beacon schedule to the ground stations of the DSG and optionally revokes and redistributes, at step 2420 (also shown in broken lines), unallocated aircraft addresses from the control site common address information base. If the control site receives a user instruction to cease DSG operations, at step 2422, DSG operations are terminated, otherwise, the control site continues to receive and process STR's and other messages at step 2406.

If at step 2410, the control site determines that no aircraft is transitioning between ground stations of the DSG, the control site assesses, at step 2412, whether an aircraft is entering or leaving the DSG. If so, the control site processing continues, at step 2416, with an assessment of the impact of the aircraft DSG entry/exit to ground station traffic loads, otherwise, the control site continues to receive and process STR's and other messages at step 2406.

Figure 25:
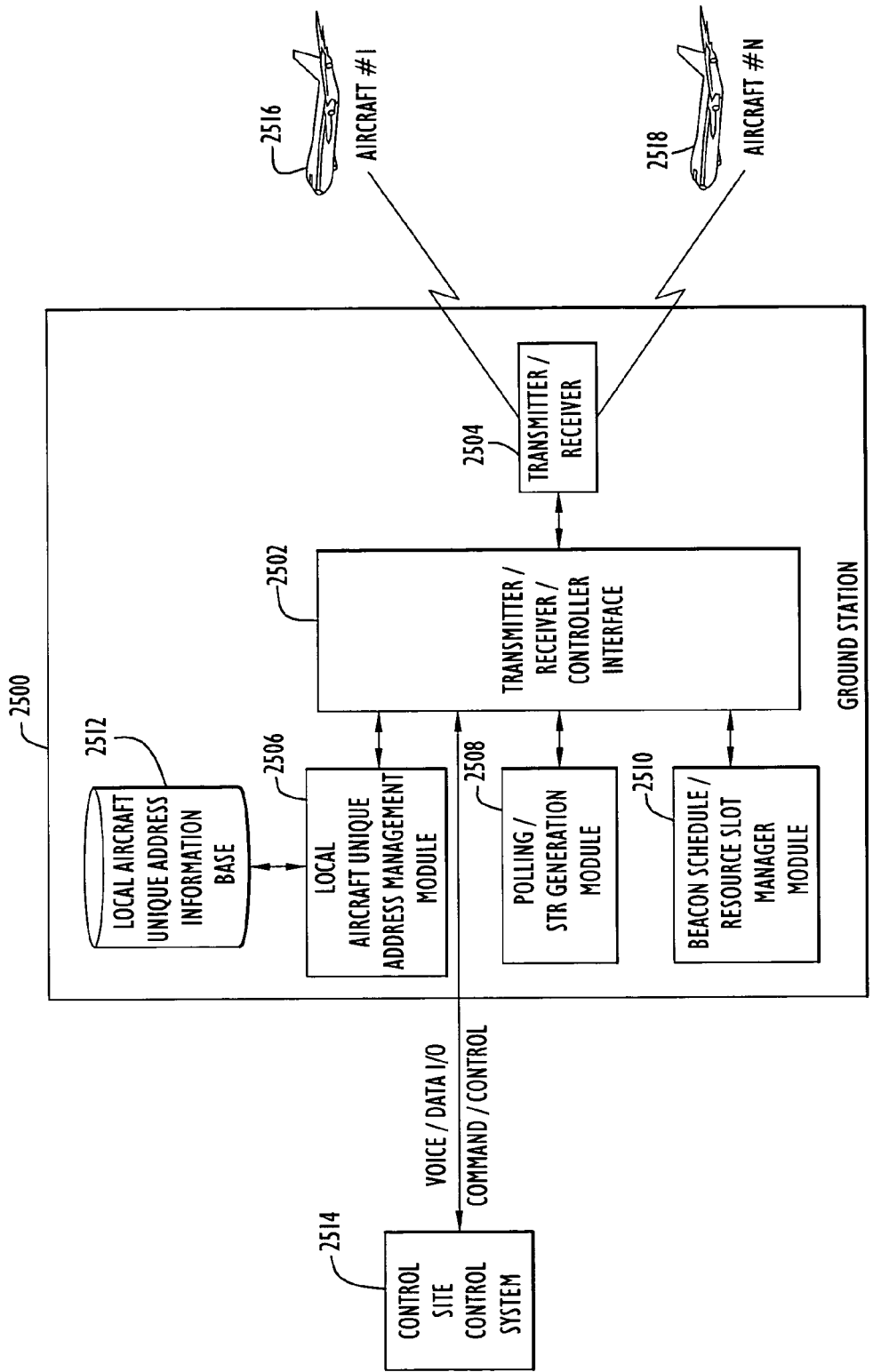
FIG. 25 is a system level block diagram of a VDL-3 DSG ground station, in accordance with an exemplary embodiment of the present invention.

FIG. 25 is a system level block diagram of a VDL-3 DSG ground station (GS) 2500 used to coordinate communication with aircraft supported by a VDL-3 DSG. As shown in FIG. 25, a ground station 2500 includes a transmitter/receiver/controller interface 2502 that supports voice, data, and command/control communications with a VDL-3 control site control system 2514 and transmit/receive VDL-3 A/G radio communications with aircraft assigned to the ground station via a VDL-3 transmitter/receiver 2504. To allow the ground station to support VDL-3 DSG A/G communication, the input/output control system interface 2502 communicates a local aircraft unique address management module 2506, a polling/STR generation module 2508 and a beacon schedule/slot resource manager module 2510.

The local aircraft unique address management module 2506 coordinates with the control site DSG address manager module 2304 (shown in FIG. 23) and exercises limited control over aircraft unique addresses delegated to the ground station as described with respect to FIG. 8 and FIG. 9, above. The local aircraft unique address management module 2506 provides input to and retrieves data from a local aircraft unique address information base 2512 that serves as a repository for tracking local assigned and unassigned unique aircraft addresses, as described with respect to FIG. 8 and FIG. 9.

The polling/STR generation module 2508 coordinates with the control site handover control module 2306 (as shown in FIG. 23) by issuing poll requests to aircraft assigned to the ground station and generating STR and other messages containing TOA and signal quality information, as described with respect to FIG. 21 and FIG. 22, above.

The beacon schedule/slot resource manager 2510 coordinates with the control site beacon schedule/data slot resource manager (DSRM) module 2308 (as shown in FIG. 23) by receiving beacon schedules and working with the ground station transmitter/receiver/controller interface 2502 to coordinate transmission of data and command/control signals within the time slots defined for the ground station in accordance with the beacon schedule, as described with respect to FIG. 10, FIG. 11 and FIG. 12, above. The beacon schedule/slot resource manager 2510 also coordinates with the ground station transmitter/receiver/controller interface 2502 to assess inbound traffic loads and to send data slot requests to the control site beacon schedule/data slot resource manager (DSRM) module 2308, as described with respect to FIG. 16, FIG. 17 and FIG. 18, above.

Figure 26:
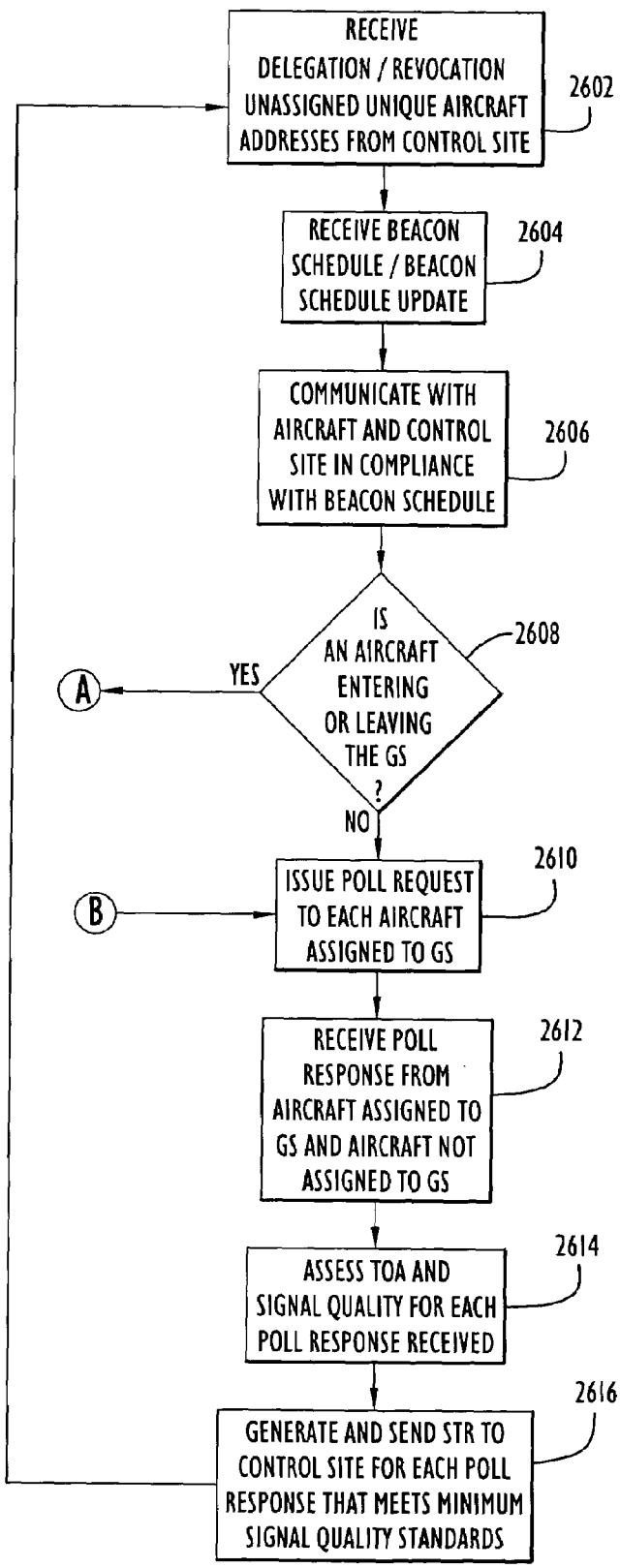
FIG. 26 is a procedural flow-chart illustrating operation of a VDL-3 DSG ground station, in accordance with an exemplary embodiment of the present invention.

FIG. 26 is a representative, non-limiting, procedural flow-chart illustrating operation of a VDL-3 DSG ground station 2500 as depicted in FIG. 25. As shown in FIG. 26, upon initiation of a VDL-3 ground station (GS) in a DSG configuration, the ground station receives, at step 2602, delegation of a set of unallocated unique aircraft addresses from the DSG control site and, at step 2604, a beacon schedule from the DSG control site. Having received a store of unassigned aircraft addresses and a beacon schedule, the ground station proceeds to communicate, at step 2606, with aircraft in the airspace supported by the ground station, as described above. If an aircraft, at step 2608, enters or leaves the ground station, the ground station supports the entry or exit as described with respect to FIG. 9. The ground station issues, at step 2610 a poll request to each aircraft to which it has assigned a unique aircraft address, as described above. At step 2612, the ground station receives poll responses from aircraft responding to poll requests issues by the current, or other ground stations of the DSG, assesses, at step 2614, the TOA and signal quality for each poll response received and generates, at step 2616, an STR for each poll response that meets minimum signal quality standards and send the generated STR to the control site. Processing then resumes at step 2602, so that the ground station can receive new unique aircraft address delegations/revocations, at step 2602, and/or a new beacon schedule, at step 2604, based upon the control site's assessment of DSG/GS status information, as described above.

Having described preferred embodiments of a new and improved methods and apparatus for implementing diversity site group operations in air/ground communications, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. In an air/ground communication environment in which a control site communicates with a plurality of aircraft via a plurality of ground stations, wherein each of the plurality of aircraft is in radio communication with at least one of the plurality of ground stations, and the plurality of ground stations and the plurality of aircraft share a common air/ground communication channel, a method of allocating transmission time slots to the plurality of ground stations, the method comprising:
    (a) building a transmission time slot schedule containing a transmission time slot allocation for at least one of the plurality of ground stations; and
    (b) distributing the transmission time slot schedule from the control site to at least one of the plurality of ground stations;
    wherein a ground station that receives a time slot allocation assumes management over use of transmission time slots allocated to the ground station by the transmission time slot schedule, and
    wherein the transmission time slot schedule allocates VDL management time slots.

2. The method of claim 1, wherein a count of transmission time slots allocated to one of the plurality of ground stations in the transmission time slot schedule is based, at least in part, upon a count of the plurality of ground stations.

3. The method of claim 1, wherein a count of transmission time slots allocated to one of the plurality of ground stations in the transmission time slot schedule is based, at least in part, upon a count of aircraft for which said one of the plurality of ground stations has polling authority.

4. The method of claim 1, wherein a count of transmission time slots allocated to one of the plurality of ground stations in the transmission time slot schedule is based, at least in part, upon a volume of communication traffic supported by said one of the plurality of ground stations.

5. The method of claim 1, wherein the control site periodically rebuilds and redistributes the transmission time slot schedule to at least one of the plurality of ground stations.

6. In an air/ground communication environment in which a control site communicates with a plurality of aircraft via a plurality of ground stations, a method of scheduling air to ground data communication from the plurality of aircraft to the control site, the method comprising:
    (a) receiving at the control site an inbound data slot request from one of the plurality of aircraft via one of the plurality of ground stations;
    (b) storing in an information base at the control site information received in a plurality of inbound data slot requests;
    (c) assessing at the control site information stored in the information base received in the plurality of inbound data slot requests; and
    (d) transmitting, based upon the assessment, an inbound reservation from the control site to a specific aircraft via one of the plurality of ground stations that identifies a time slot that the aircraft is permitted to use to transmit data to the control site via the plurality of ground stations,
    wherein the information base contains information pertaining to each inbound data slot request received, the information including at least one of:
    a unique identifier of the aircraft making the request; and
    a priority associated with the data to be transmitted.

7. The method of claim 6, wherein step (c) includes a consideration of at least one of:
    a number of pending inbound data requests;
    a priority of the pending inbound data requests;
    a volume of pending outbound data; and
    a priority of the pending outbound data.

8. An air/ground communication system that supports communication with a plurality of aircraft, the system comprising:
    a plurality of ground stations, wherein each of the plurality of aircraft is in radio communication with at least one of the plurality of ground stations and wherein the plurality of aircraft share a common air/ground communication channel with the plurality of ground stations;
    a control site, in communication with the plurality of ground stations, that allocates a plurality of time slots used by the plurality of ground stations to share the common air/ground communication channel and to support communication between the plurality of aircraft and the control site,
    wherein the control site maintains an information base containing a plurality of unique aircraft addresses and status information associated with each of the plurality of unique aircraft addresses;
    wherein the control site delegates authority to assign at least one of the plurality of unique aircraft addresses to at least one of the plurality of ground stations; and
    wherein the control site updates the status information associated with each of the plurality of unique aircraft addresses based upon information contained in a message received from at least one of the plurality of ground stations.

9. The system of claim 8, wherein the control site builds a transmission time slot schedule containing a transmission time slot allocation for at least one of the plurality of ground stations and distributes the transmission time slot schedule to at least one of the plurality of ground stations; and
    wherein a ground station that receives a time slot allocation assumes management over use of transmission time slots allocated to the ground station by the transmission time slot schedule.

10. The system of claim 8, wherein the control site receives a poll response report from a first ground station and a poll response report from a second ground station, wherein each of the poll response reports contains a time of arrival (TOA) of a poll response at each of the first and second ground stations, respectively;
  wherein the control site transmits a handover command, to the first ground station and to the second ground station, that transfers polling responsibility from the first ground station to the second ground station based upon an assessment by the control site of TOA values contained in respective poll response reports.

11. The system of claim 8, wherein the control site receives from at least one of the plurality of ground stations a message that includes at least one of a ground station identifier, a unique aircraft identifier, a unique message identifier, a signal time of arrival (TOA) at the receiving ground station and signal quality information, as determined by the receiving ground station; and
  wherein the control site selects a preferred ground station for use by the control site to transmit signals to or to receive signals from a specific aircraft based upon the information received.

12. The system of claim 8, wherein the control site receives an inbound data slot request from one of the plurality of aircraft via one of the plurality of ground stations; and
  wherein the control site transmits, based at least in part upon an assessment of the data slot request received, an inbound reservation to a specific aircraft via one of the plurality of ground stations that identifies a time slot that the aircraft is permitted to use to transmit data to the control site via the plurality of ground stations.

13. The system of claim 8, wherein more than one of the plurality of ground stations receives a signal originating from one of the plurality of aircraft;
  wherein each of the plurality of ground stations receiving the signal relays the signal, a time of arrival (TOA) of the incoming signal at the ground station, and signal quality information determined by the ground station, to the control site;
  wherein the control site determines, based upon TOA and incoming signal quality information, a preferred ground station via which to receive the incoming signal; and
  wherein the control site permits the preferred ground station to forward the incoming signal received to a control site communication switch.

14. An air/ground communication system that supports communication between a control site and a plurality of aircraft, the system comprising:
  a plurality of ground stations, wherein each of the plurality of aircraft is in radio communication with at least one of the plurality of ground stations and wherein the plurality of aircraft share a common air/ground communication channel with the plurality of ground stations;
  wherein the control site, in communication with the plurality of ground stations, allocates a plurality of time slots used by the plurality of ground stations to share the common air/ground communication channel and to support communication between the plurality of aircraft and the control site,
  wherein at least one of the plurality of ground stations sends a poll response report to the control site upon receiving a poll response from an aircraft wherein the poll response report contains a time of arrival (TOA) of a poll response at the ground station; and
  wherein a ground station receives a handover command from the control site based upon an assessment of TOA values contained in the poll response reports received.

15. The system of claim 14, wherein at least one of the plurality of ground stations receives a transmission time slot schedule from the control site containing a transmission time slot allocation for at least one of the plurality of ground stations; and
  wherein a ground station that receives a time slot allocation assumes management over use of transmission time slots allocated to the ground station by the transmission time slot schedule.

16. The system of claim 14, wherein at least one of the plurality of ground stations is delegated authority from the control site to assign at least one of a plurality of unique aircraft addresses;
  wherein at least one of the plurality of ground stations maintains a local information base containing the plurality of delegated unique aircraft addresses and status information associated with at least one of the plurality of delegated unique aircraft addresses;
  and
  wherein at least one of the plurality of ground stations delegated unique aircraft addresses updates the status information associated with at least one of the plurality of unique aircraft addresses and sends a corresponding update message to the control site.

17. The system of claim 14, wherein at least one of said plurality of ground stations upon receiving a message from an aircraft relays the received message to the control site and includes within the relayed message at least one of an identifier for the ground station, a unique aircraft identifier, a unique message identifier, and a signal time of arrival (TOA) at the receiving ground station and signal quality information, as determined by the receiving ground station.

18. The system of claim 14, wherein a ground station relays an inbound data slot request from an aircraft to the control site; and
  wherein the ground station receives and relays an inbound reservation from the control site to the aircraft that identifies a time slot that the aircraft is permitted to use to transmit data to the control site via the plurality of ground stations.

19. The system of claim 14, wherein at least one of the plurality of ground stations receives a signal originating from one of the plurality of aircraft;
  wherein each of the plurality of ground stations receiving the signal relays the signal, a time of arrival (TOA) of the incoming signal at the ground station, and signal quality information determined by the ground station, to the control site;
  wherein a preferred ground station, selected by the control site based upon the relayed TOA and incoming signal quality information, is permitted to forward the incoming signal received to a control site communication switch.

20. An air/ground communication system that supports communication with a plurality of aircraft via a plurality of ground stations, wherein each of the plurality of aircraft is in radio communication with at least one of the plurality of ground stations and wherein the plurality of aircraft share a common air/ground communication channel with the plurality of ground stations, the system comprising:
  a control site, in communication with the plurality of ground stations, that allocates time slots used by the plurality of ground stations to share the common air/ground communication channel and coordinate communication between the plurality of aircraft and the control site, wherein the control site receives from at least one of the plurality of ground stations a message that includes at least one of a ground station identifier, a unique aircraft identifier, a unique message identifier, a signal time of arrival (TOA) at the receiving ground station and signal quality information as determined by the receiving ground station; and wherein the control site selects a preferred ground station for use by the control site to transmit a signal to or to receive a signal from a specific aircraft based upon the information received, and wherein the control site selects a preferred ground station based upon TOA and incoming signal quality information to forward an incoming signal received to a control site communication switch.

21. The system of claim 20, wherein the control site builds a transmission time slot schedule containing a transmission time slot allocation for at least one of the plurality of ground stations and distributes the transmission time slot schedule to at least one of the plurality of ground stations.

22. The system of claim 20, wherein the control site maintains an information base containing a plurality of unique aircraft addresses and status information associated with each of the plurality of unique aircraft addresses;

wherein the control site delegates authority to assign at least one of the plurality of unique aircraft addresses to at least one of the plurality of ground stations; and wherein the control site updates the status information associated with each of the plurality of unique aircraft addresses based upon information contained in a message received from at least one of the plurality of ground stations.

23. The system of claim 20, wherein the control site receives a poll response report from a first ground station and a poll response report from a second ground station, wherein each of the poll response reports contains a time of arrival (TOA) of a poll response at each of the first and second ground stations, respectively;

wherein the control site transmits a handover command, to the first ground station and to the second ground station, that transfers polling responsibility from the first ground station to the second ground station based upon an assessment by the control site of TOA values contained in the respective poll response reports.

24. The system of claim 20, wherein the control site receives an inbound data slot request from one of the plurality of aircraft via one of the plurality of ground stations; and wherein the control site transmits, based at least in part upon an assessment of the data slot request received, an inbound reservation to a specific aircraft via one of the plurality of ground stations that identifies a time slot that the aircraft is permitted to use to transmit data to the control site via the plurality of ground stations.

* * * * *